United States Patent
Liu et al.

(10) Patent No.: US 12,418,937 B2
(45) Date of Patent: Sep. 16, 2025

(54) MAINTAINING CHANNEL OCCUPANCY TIME ACROSS SIDELINK SYNCHRONIZATION SIGNAL BLOCK SLOTS IN UNLICENSED SIDELINK

(71) Applicant: QUALCOMM Incorporated, San Diego, CA (US)

(72) Inventors: Chih-Hao Liu, San Diego, CA (US); Giovanni Chisci, San Diego, CA (US); Jing Sun, San Diego, CA (US); Yisheng Xue, San Diego, CA (US); Xiaoxia Zhang, San Diego, CA (US); Qing Li, Princeton Junction, NJ (US); Jae Ho Ryu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 433 days.

(21) Appl. No.: 17/878,556

(22) Filed: Aug. 1, 2022

(65) Prior Publication Data

US 2024/0040615 A1 Feb. 1, 2024

(51) Int. Cl.
*H04W 74/0808* (2024.01)

(52) U.S. Cl.
CPC .............. *H04W 74/0808* (2013.01)

(58) Field of Classification Search
CPC .............................. H04W 74/0808
See application file for complete search history.

(56) References Cited

U.S. PATENT DOCUMENTS

| | | | |
|---|---|---|---|
| 2020/0153574 A1* | 5/2020 | Shin | H04W 4/40 |
| 2021/0092783 A1 | 3/2021 | Sun et al. | |
| 2021/0234663 A1* | 7/2021 | Kim | H04L 5/0092 |
| 2022/0263613 A1* | 8/2022 | Fan | H04L 5/006 |
| 2022/0400483 A1* | 12/2022 | Ko | H04L 5/0033 |
| 2023/0121866 A1* | 4/2023 | Wu | H04L 5/005 |
| | | | 370/329 |
| 2023/0247528 A1 | 8/2023 | Liu et al. | |
| 2024/0172280 A1* | 5/2024 | Pan | H04W 74/0808 |

(Continued)

OTHER PUBLICATIONS

International Search Report and Written Opinion—PCT/US2023/070201—ISA/EPO—Jan. 4, 2024.

(Continued)

*Primary Examiner* — Michael Thier
*Assistant Examiner* — Tracy Lauren Colbert
(74) *Attorney, Agent, or Firm* — Holland & Hart LLP

(57) ABSTRACT

Methods, systems, and devices for wireless communication are described. In some cases, a first user equipment (UE) may perform a listen-before-talk (LBT) procedure to identify a channel occupancy time (COT). The COT may include some slots for transmitting a sidelink message and some sidelink synchronization signal block (S-SSB) slots for transmitting S-SSBs. In some examples, to fill a gap created by the S-SSB slots within the COT and thus maintain the COT across the S-SSB slots, the first UE or the second UE may transmit some signaling to provide transmissions in the S-SSB slots. For example, the first UE may transmit a padding signal, the second UE may transmit S-SSBs, or the UEs may use a gap control procedure. Upon filling the gap, the first UE may transmit a sidelink message to the second UE in slots of the COT excluding the S-SSB slots.

29 Claims, 18 Drawing Sheets

(56) References Cited

U.S. PATENT DOCUMENTS

2024/0276544 A1* 8/2024 Zhao .................. H04W 72/563

OTHER PUBLICATIONS

Apple Inc: "On Channel Access Mechanism for Sidelink on FR1 Unlicensed Spectrum", 3GPP TSG-RAN WG1 Meeting #109-e, R1-2204247, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, Apr. 29, 2022, XP052153428, 4 pages, the whole document.

CMCC: "Discussion on Physical Channel Design Framework for Sidelink on Unlicensed Spectrum", 3GPP TSG RAN WG1 #109-e, R1-2204307, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, Apr. 29, 2022, XP052153470, pp. 1-9, the whole document.

Partial International Search Report—PCT/US2023/070201—ISA/EPO—Nov. 6, 2023.

* cited by examiner

MAINTAINING CHANNEL OCCUPANCY TIME ACROSS SIDELINK SYNCHRONIZATION SIGNAL BLOCK SLOTS IN UNLICENSED SIDELINK

FIELD OF TECHNOLOGY

The present disclosure relates to wireless communication, including maintaining channel occupancy time (COT) across sidelink synchronization signal block (S-SBS) slots in unlicensed sidelink.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communications systems may support sidelink communications between multiple UEs. Some UEs may transmit data across a channel occupancy time (COT). In some cases, however, the COT may be terminated due to a gap in resources during the COT.

SUMMARY

The described techniques relate to improved methods, systems, devices, and apparatuses that support maintaining channel occupancy time (COT) across sidelink synchronization signal block (S-SSB) slots in unlicensed sidelink. For example, the described techniques provide for a user equipment (UE) to pad or fill a transmission gap across a COT created by one or more S-SSB slots. In some examples, a first UE may perform a listen-before-talk (LBT) procedure to identify a COT having multiple slots during which the first UE may transmit a sidelink message. In addition, one or more slots included within the COT may be S-SSB slots configured for S-SSB transmissions. In some cases, the first UE may transmit control signaling to the second UE identifying the S-SSB slots. As the S-SSB slots may create a gap in data transmissions during the COT, the first UE or the second UE may fill or pad the gap such that the COT is maintained during the S-SSB slots. For example, the first UE may transmit signaling to provide transmissions that fill the one or more S-SSB slots, such as a padding signal, and the first UE may transmit the sidelink message to the second UE using the multiple slots of the COT (excluding the S-SSB slots). Alternatively, the first UE may transmit a message to the second UE indicating which slots of the COT are to be used for communicating the sidelink message and which slots of the COT are S-SSB slots. Based on receiving the message, the second UE may transmit one or more S-SSBs during the S-SSB slots. That is, the first UE may share the COT with the second UE and schedule the S-SSB transmissions in the S-SSB slots within the COT.

A method for wireless communication at a first UE is described. The method may include performing a LBT procedure to identify a COT that includes a set of multiple slots for transmitting a sidelink message, transmitting signaling to provide transmissions in one or more slots that are within the COT based on determining that the one or more slots are for S-SSBs, and transmitting, to a second UE, the sidelink message in the set of multiple slots of the COT.

An apparatus for wireless communication at a first UE is described. The apparatus may include a processor, memory coupled with the processor, and instructions stored in the memory. The instructions may be executable by the processor to cause the apparatus to perform a LBT procedure to identify a COT that includes a set of multiple slots for transmitting a sidelink message, transmit signaling to provide transmissions in one or more slots that are within the COT based on determining that the one or more slots are for S-SSBs, and transmit, to a second UE, the sidelink message in the set of multiple slots of the COT.

Another apparatus for wireless communication at a first UE is described. The apparatus may include means for performing a LBT procedure to identify a COT that includes a set of multiple slots for transmitting a sidelink message, means for transmitting signaling to provide transmissions in one or more slots that are within the COT based on determining that the one or more slots are for S-SSBs, and means for transmitting, to a second UE, the sidelink message in the set of multiple slots of the COT.

A non-transitory computer-readable medium storing code for wireless communication at a first UE is described. The code may include instructions executable by a processor to perform a LBT procedure to identify a COT that includes a set of multiple slots for transmitting a sidelink message, transmit signaling to provide transmissions in one or more slots that are within the COT based on determining that the one or more slots are for S-SSBs, and transmit, to a second UE, the sidelink message in the set of multiple slots of the COT.

In some examples of the method, apparatuses, and non-transitory computer-readable medium described herein, transmitting the signaling to provide transmissions may include operations, features, means, or instructions for determining that a first S-SSB may be to be transmitted in a first slot of the one or more slots and transmitting a second S-SSB in at least one subsequent slot of the one or more slots.

In some examples of the method, apparatuses, and non-transitory computer-readable medium described herein, the second S-SSB may be a repetition of the first S-SSB.

In some examples of the method, apparatuses, and non-transitory computer-readable medium described herein, transmitting the signaling to provide transmissions may include operations, features, means, or instructions for transmitting, by the first UE, a padding signal in the one or more slots for S-SSBs.

In some examples of the method, apparatuses, and non-transitory computer-readable medium described herein, the padding signal includes a S-SSB.

In some examples of the method, apparatuses, and non-transitory computer-readable medium described herein, the COT may be for a subband, and where the padding signal includes a first signal on a first set of resource blocks adjacent a first frequency edge of the subband, and a second signal on a second set of resource blocks adjacent a second frequency edge of the subband.

In some examples of the method, apparatuses, and non-transitory computer-readable medium described herein, transmitting the signaling to provide transmissions may include operations, features, means, or instructions for determining that a first S-SSB may be to be transmitted in a slot of the one or more slots and transmitting a padding signal in a last one or more symbol periods of the slot of the one or more slots that may be for S-SSBs.

In some examples of the method, apparatuses, and non-transitory computer-readable medium described herein, the padding signal includes a repetition of a physical broadcast channel (PBCH) signal of the first S-SSB.

In some examples of the method, apparatuses, and non-transitory computer-readable medium described herein, the padding signal includes a cyclic prefix extension (CPE) of a signal in a first symbol of a first slot of the set of multiple slots for transmitting the sidelink message, where the first slot may be immediately subsequent to the slot of the one or more slots that may be for S-SSBs.

In some examples of the method, apparatuses, and non-transitory computer-readable medium described herein, transmitting the signaling to provide transmissions may include operations, features, means, or instructions for transmitting, to a second UE, an indication for the second UE to transmit one or more S-SSBs in the one or more slots that may be for S-SSBs.

In some examples of the method, apparatuses, and non-transitory computer-readable medium described herein, transmitting the signaling to provide transmissions may include operations, features, means, or instructions for transmitting, by the first UE in the one or more slots, sidelink signals in frequency resources that may be multiplexed with frequency resources allocated to the S-SSBs.

In some examples of the method, apparatuses, and non-transitory computer-readable medium described herein, transmitting the signaling to provide transmissions may include operations, features, means, or instructions for transmitting, to a second UE, an indication for the second UE to transmit a repetition of one or more S-SSBs to span the one or more slots that may be for S-SSBs.

In some examples of the method, apparatuses, and non-transitory computer-readable medium described herein, transmitting the signaling to provide transmissions may include operations, features, means, or instructions for transmitting, to the second UE, an indication for the second UE to transmit a CPE of a signal in a last symbol of a slot of the set of multiple slots that immediately precedes a first symbol of a first slot of the one or more slots, where the signal may be of a S-SSB that may be in a first symbol of a first slot of the one or more slots that may be for S-SSBs.

Some examples of the method, apparatuses, and non-transitory computer-readable medium described herein may further include operations, features, means, or instructions for transmitting, to the second UE, an indication for the second UE to rate match a PBCH signal from a first symbol of a first slot of the one or more slots to a last symbol of a slot of the set of multiple slots that immediately precedes the first symbol of the first slot.

Some examples of the method, apparatuses, and non-transitory computer-readable medium described herein may further include operations, features, means, or instructions for transmitting, to the second UE, an indication of a type of the LBT procedure and an indication of a gap control procedure for an end of a S-SSB to be transmitted by the second UE.

Some examples of the method, apparatuses, and non-transitory computer-readable medium described herein may further include operations, features, means, or instructions for receiving control signaling identifying a S-SSB transmission configuration, where the determining that the one or more slots may be for S-SSBs may be based on the received control signaling.

A method for wireless communication at a second UE is described. The method may include receiving control signaling identifying a set of slots for S-SSBs, receiving, from a first UE, a message indicating a COT that includes a set of multiple slots for the first UE to use to transmit a sidelink message and indicating one or more slots of the set of slots during which the second UE is to transmit one or more S-SSBs, the one or more slots being within the COT, and transmitting the one or more S-SSBs during the one or more slots based on the message receiving from the first UE.

An apparatus for wireless communication at a second UE is described. The apparatus may include a processor, memory coupled with the processor, and instructions stored in the memory. The instructions may be executable by the processor to cause the apparatus to receive control signaling identifying a set of slots for S-SSBs, receive, from a first UE, a message indicating a COT that includes a set of multiple slots for the first UE to use to transmit a sidelink message and indicating one or more slots of the set of slots during which the second UE is to transmit one or more S-SSBs, the one or more slots being within the COT, and transmit the one or more S-SSBs during the one or more slots based on the message receiving from the first UE.

Another apparatus for wireless communication at a second UE is described. The apparatus may include means for receiving control signaling identifying a set of slots for S-SSBs, means for receiving, from a first UE, a message indicating a COT that includes a set of multiple slots for the first UE to use to transmit a sidelink message and indicating one or more slots of the set of slots during which the second UE is to transmit one or more S-SSBs, the one or more slots being within the COT, and means for transmitting the one or more S-SSBs during the one or more slots based on the message receiving from the first UE.

A non-transitory computer-readable medium storing code for wireless communication at a second UE is described. The code may include instructions executable by a processor to receive control signaling identifying a set of slots for S-SSBs, receive, from a first UE, a message indicating a COT that includes a set of multiple slots for the first UE to use to transmit a sidelink message and indicating one or more slots of the set of slots during which the second UE is to transmit one or more S-SSBs, the one or more slots being within the COT, and transmit the one or more S-SSBs during the one or more slots based on the message receiving from the first UE.

Some examples of the method, apparatuses, and non-transitory computer-readable medium described herein may further include operations, features, means, or instructions for receiving, from the first UE, an indication of a type of LBT procedure associated with the COT.

Some examples of the method, apparatuses, and non-transitory computer-readable medium described herein may further include operations, features, means, or instructions for transmitting one or more repetitions of the one or more S-SSBs during the one or more slots within the COT.

Some examples of the method, apparatuses, and non-transitory computer-readable medium described herein may further include operations, features, means, or instructions for receiving an indication that the second UE may be to disable transmission of one or more S-SSBs.

Some examples of the method, apparatuses, and non-transitory computer-readable medium described herein may further include operations, features, means, or instructions for receiving, via COT system information (SI) or sidelink control information (SCI), an indication that the second UE may be to transmit the one or more S-SSBs during the one or more slots within the COT.

In some examples of the method, apparatuses, and non-transitory computer-readable medium described herein, the SCI indicates a quantity of slots of the one or more slots in which the second UE may be to transmit the one or more S-SSBs.

Some examples of the method, apparatuses, and non-transitory computer-readable medium described herein may further include operations, features, means, or instructions for receiving, from the first UE, an indication for the second UE to transmit a CPE of a signal in a last symbol of a slot of the set of multiple slots that immediately precedes a first symbol of a first slot of the one or more slots, where the signal may be of a S-SSB that may be in a first symbol of a first slot of the one or more slots that may be for S-SSBs.

Some examples of the method, apparatuses, and non-transitory computer-readable medium described herein may further include operations, features, means, or instructions for receiving, from the first UE, an indication for the second UE to rate match a PBCH signal from a first symbol of a first slot of the one or more slots to a last symbol of a slot of the set of multiple slots that immediately precedes the first symbol of the first slot.

DETAILED DESCRIPTION

Figure 1:
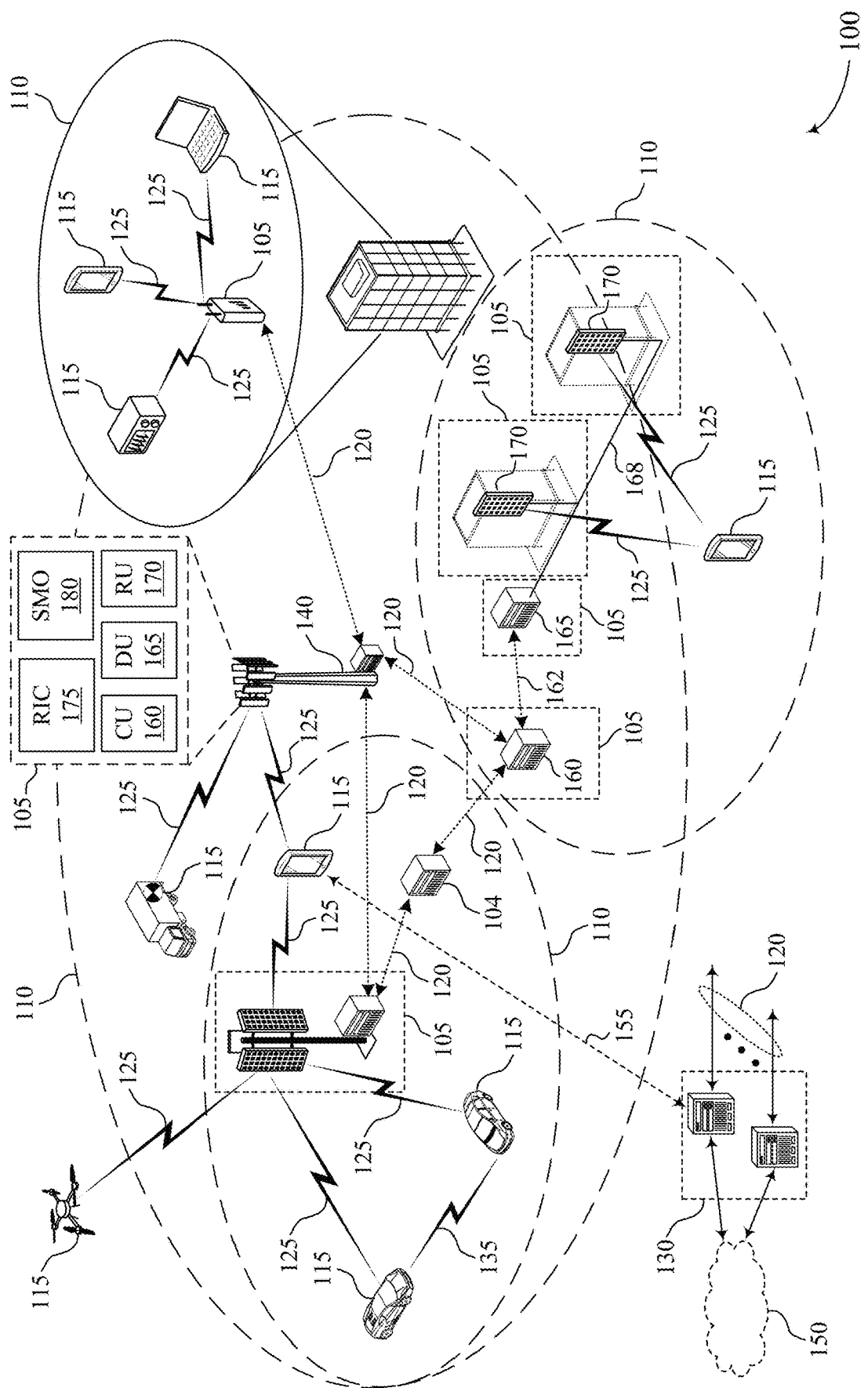
FIG. 1 illustrates an example of a wireless communications system that supports maintaining channel occupancy time (COT) across sidelink synchronization signal block (S-SSB) slots in unlicensed sidelink in accordance with one or more aspects of the present disclosure.

In an unlicensed wireless communications system (e.g., an unlicensed New Radio (NR)) system), user equipments (UEs) may communicate via a sidelink link. For example, some UEs may communicate sidelink synchronization signal blocks (S-SSBs) via S-SSB instances or slots. In some cases, a UE may determine when to communicate data with another UE based on a channel occupancy time (COT), which may indicate a structure of multiple resources (e.g., slots), each slot including designated resources for downlink, uplink, or flexible communications, among other uses.

In some cases, a data resource pool available for use by a UE may exclude S-SSB slots (e.g., slots configured for S-SSB transmissions). A UE may perform a first listen-before-talk (LBT) procedure and transmit a data burst during a COT. If the transmission occurs over an S-SSB slot, which is excluded from the data resource pool, the UE may terminate the COT at the S-SSB slot. That is, due to a gap in the data burst transmission at the S-SSB slot, the UE may prematurely terminate the COT. The UE may then perform a second LBT procedure and reinitiate the COT after the gap, which may increase system overhead and increase resource (e.g., time and power) consumption for the UE.

The techniques described herein may support maintaining a COT across S-SSB slots in an unlicensed wireless communications system, for example, for unlicensed sidelink communications. A wireless communications systems may support a first UE and a second UE, where the first UE may be a COT initiator (e.g., a UE that initiates a COT), and where the second UE may be a synchronization reference (syncRef) node capable of transmitting S-SSBs and other synchronization signals. In some examples, the first UE may perform an LBT procedure to identify a COT having multiple slots during which the first UE may transmit a sidelink message. In addition, one or more slots of the COT may be S-SSB slots configured for S-SSB transmissions. As the S-SSB slots may create a gap in data transmissions during the COT, the first UE or the second UE may fill or pad the gap such that the COT is maintained during the S-SSB slots.

In some examples, the first UE may transmit signaling to provide transmissions and fill the gap in the S-SSB slots, such as a padding signal. Then, the first UE may transmit the sidelink message to the second UE using the multiple slots of the COT (excluding the S-SSB slots). Alternatively, the first UE may transmit control signaling to the second UE identifying the S-SSB slots, and the first UE may transmit a message to the second UE indicating the COT which includes the multiple slots for communicating the sidelink message, and indicating one or more S-SSB slots of the COT during which the second UE is to transmit one or more S-SSBs. Based on the message, the second UE may transmit the one or more S-SSBs during the one or more S-SSB slots, filling the gap created by the S-SSB slots with S-SSB transmissions themselves. That is, the first UE may share the COT with the second UE, and schedule the S-SSB transmissions in the S-SSB slots within the COT.

Aspects of the disclosure are initially described in the context of wireless communications systems. Aspects of the disclosure are then described in the context of sidelink transmission schemes, S-SSB structures, and process flows. Aspects of the disclosure are further illustrated by and described with reference to apparatus diagrams, system diagrams, and flowcharts that relate to maintaining COT across S-SSB slots in unlicensed sidelink.

FIG. 1 illustrates an example of a wireless communications system 100 that supports maintaining a COT across S-SSB slots in unlicensed sidelink in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, an NR network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network node, a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support maintaining a COT across S-SSB slots in unlicensed sidelink as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180). Devices in wireless communications system 100 may communicate over unlicensed spectrum, such as the 5 GHz band, the 2.4 GHz band, the 60 GHz band, the 3.6 GHz band, and/or the 900 MHz band. The unlicensed spectrum may also include other frequency bands.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix (CP). A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the CP prepended to each symbol period). In some wireless communications systems 100, a slot may further be divided into multiple mini-slots associated with one or more symbols. Excluding the CP, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may support sidelink communications between multiple UEs 115. For example, UEs 115 in an unlicensed NR system may transmit S-SSBs during S-SSB slots. In some examples, an S-SSB may include eleven uniform resource blocks across in one slot (e.g., a full slot transmission), where the slot may include 14 symbols including a gap symbol. In some examples, the S-SSB may fail to satisfy an occupied channel bandwidth (OCB) requirement alone. In addition, an S-SSB may be standalone rather than multiplexed with other signals (e.g., physical sidelink control channels (PSCCHs), physical sidelink shared channels (PSSCHs)) as the 11 resource block structure of the S-SSB may be different from a resource pool structure for the other signals. Some UEs 115 may transmit S-SSBs according to an S-SSB period of 160 ms, where a quantity of S-SSBs instances or slots (e.g., K) within the S-SSB period may depend on a subcarrier spacing in frequency range 1 (FR1). For example, there may be one S-SSB instance in the S-SSB period for a subcarrier spacing of 15 kHz, one or two S-SSB instances in the S-SSB period for a subcarrier spacing of 30 kHz, or one, two, or four S-SSB instances in the S-SSB period for a subcarrier spacing of 60 kHz.

Some unlicensed sidelink systems may utilize multiple S-SSB candidate positions or discovery reference signal (DRS) windows to address LBT procedures. For example, reusing an unlicensed NR DRS window design with multiple candidate locations may increase a quantity of S-SSB occasions within one S-SSB instance, the quantity of S-SSB instances, or both. For example, the UE 115 may transmit up to K S-SSB slots within a quantity L of candidate locations after clearing an LBT procedure (e.g., K=4 in L=10 candidate locations, or K=8 in L=20 candidate locations).

In some examples, a data resource pool may exclude S-SSB slots, which may reduce the ability for UEs 115 to communicate S-SSBs efficiently. For example, if a data COT transmission is across S-SSB occasions and a transmitting UE 115 refrains from transmitting an S-SSB, the UE 115 may prematurely terminate the COT. Additionally, if there are multiple S-SSB candidate slots (e.g., positions) available, the overhead of the S-SSBs may be substantial and may reduce signaling throughput, for example in the case of eMBB traffic.

In some cases where S-SSB slots are excluded from a data resource pool, a UE 115 may transmit a data burst across the S-SSB slots (e.g., instead of transmitting S-SSBs). Accordingly, the UE 115 may terminate the COT at the S-SSB slots, and may reinitiate the COT after the S-SSB slots for the remaining data burst. That is, the COT may be terminated due to a gap in transmission across the S-SSB slots (e.g., the gap being in between the COT transmissions), and the UE 115 may perform a second LBT procedure to reinitiate the COT and transmit the remaining data burst. Terminating and reinitiating a COT due to the gap in transmissions in this way may increase signaling overhead and resource consumption for the UE 115.

The wireless communications system 100 may support maintenance of a COT during S-SSB slots for unlicensed sidelink communications between a first UE 115 (e.g., a COT initiator) and a second UE 115 (e.g., a syncRef node). The first UE 115 may perform an LBT procedure to identify a COT having multiple slots during which the first UE 115 may transmit a sidelink message. In addition, one or more slots included within the COT may be S-SSB slots configured for S-SSB transmissions. In some cases, the first UE 115 may transmit control signaling to the second UE 115 identifying the S-SSB slots. As the S-SSB slots may create a gap in data transmissions during the COT, the first UE 115 or the second UE 115 may fill or pad the gap such that the COT is maintained during the S-SSB slots. For example, the first UE 115 may transmit signaling to provide transmissions that fill the one or more S-SSB slots, such as a padding signal, and the first UE 115 may transmit the sidelink message to the second UE 115 using the multiple slots of the COT (excluding the S-SSB slots). Alternatively, the first UE 115 may transmit a message to the second UE 115 indicating which slots of the COT are to be used for communicating the sidelink message and which slots of the COT are S-SSB slots. Based on receiving the message, the second UE 115 may transmit one or more S-SSBs during the S-SSB slots. That is, the first UE 115 may share the COT with the second UE 115 and schedule the S-SSB transmissions in the S-SSB slots within the COT.

Figure 2:
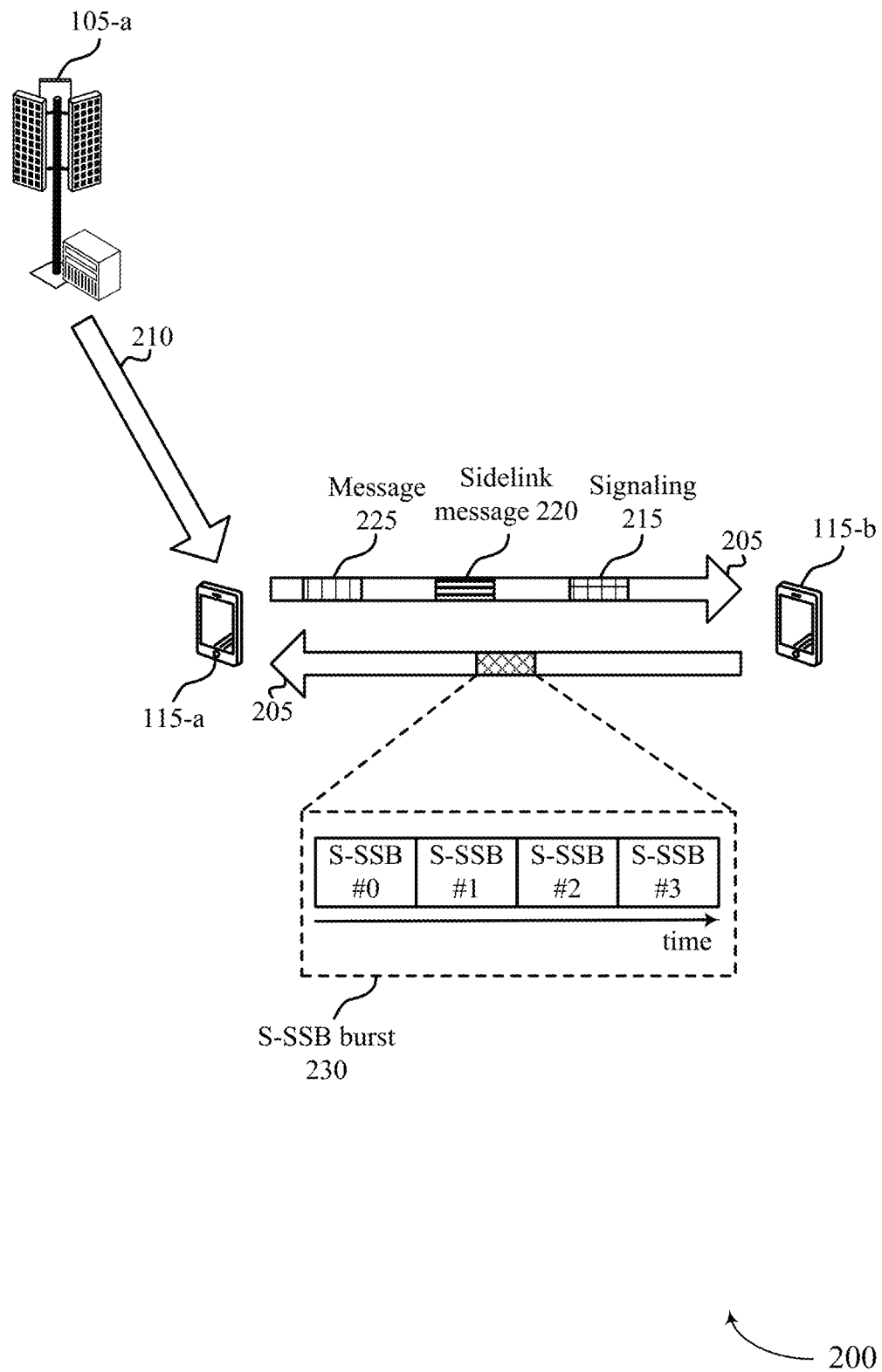
FIG. 2 illustrates an example of a wireless communications system that supports maintaining COT across S-SSB slots in unlicensed sidelink in accordance with one or more aspects of the present disclosure.

FIG. 2 illustrates an example of a wireless communications system 200 that supports maintaining a COT across S-SSB slots in unlicensed sidelink in accordance with one or more aspects of the present disclosure. The wireless communications system 200 may implement or be implemented by aspects of the wireless communications system 100 described with reference to FIG. 1. For example, the wireless communications system 200 may include a network node 105-a (e.g., a network entity), a UE 115-a (e.g., a first UE, UE0), and a UE 115-b (e.g., a second UE), which may be examples of corresponding devices described with reference to FIG. 1. The wireless communications system 200 may be an unlicensed system, such as an unlicensed NR system.

The wireless communications system 200 may support communications between the UE 115-a, the UE 115-b, and the network node 105-a. For example, the UE 115-a may communicate sidelink signals with the UE 115-b over respective sidelink communication links 205 (e.g., sidelinks). In addition, the UE 115-a may communicate signals with the network node 105-a over a communication link 210, which may be an example of a communication link 125 described with reference to FIG. 1.

To support maintenance of a COT across S-SSB slots in unlicensed sidelink communications between the UEs 115, the wireless communications system 200 may support transmissions intended to fill a gap in a data transmission created by the S-SSB slots during the COT. For example, a UE 115 may transmit an S-SSB as a COT-maintaining signal during one or more S-SSB slots, or the UE 115-a may share the COT with one or more syncRef nodes (e.g., including the UE 115-b) and maintain the COT using gap control.

In the example of FIG. 2, the UE 115-a may be a COT initiator (e.g., the UE 115-a may initiate a COT), and the UE 115-b may be a syncRef node capable of transmitting S-SSBs. The UE 115-a may perform an LBT procedure to identify a COT. The COT may include a set of multiple slots for transmitting a sidelink message 220 to the UE 115-b. That is, the set of multiple slots of the COT may include resources allocated for the transmission of the sidelink message 220. In some cases, the UE 115-a may determine that the one or more slots within the COT are S-SSB slots configured for transmitting S-SSBs. For example, the UE 115-a may receive control signaling (e.g., from the network node 105-a) identifying an S-SSB configuration, and the UE 115-a may determine that the one or more slots are S-SSB slots based on the received control signaling. In some cases, the UE 115-a may transmit control signaling to the UE 115-b identifying the S-SSB slots.

As the S-SSB slots may create a gap in data transmissions during the COT, the UE 115-a or the UE 115-b may fill the gap with other transmissions or signaling to maintain the COT. For example, the UE 115-a may transmit signaling 215 to provide transmissions in the S-SBS slots to effectively fill the gap. In some examples, the signaling 215 may include a padding signal or other signal transmitted by the UE 115-a to directly fill the gap, or the signaling 215 may indicate that the UE 115-b is to fill the gap (e.g., with S-SSBs). The UE 115-a may then transmit the sidelink message 220 to the UE 115-b using the set of slots of the COT (excluding the S-SSB slots). As such, the UE 115-a may maintain the COT across the S-SSB slots by filling the gap created by the S-SSB slots in accordance with the signaling 215.

Alternatively, the UE 115-a may share the COT with the UE 115-b and schedule S-SSB transmissions in the S-SSB slots to maintain the COT. That is, if the UE 115-a detects one or more syncRef nodes in the wireless communications system 200 transmitting S-SSBs (e.g., the UE 115-b), the syncRef nodes may transmit S-SSBs during the S-SSB slots to fill the gap rather than the UE 115-a transmitting the S-SSBs on its own. For example, after transmitting control signaling to the UE 115-b identifying the S-SSB slots of the COT, the UE 115-a may transmit a message 225 to the UE 115-b, the message 225 indicating the COT that includes the set of multiple slots which the UE 115-a may use for transmitting the sidelink message 220, and indicating one or more S-SSB slots of the COT which the UE 115-b may use to transmit S-SSBs, for example, in an S-SSB burst 230. Based on receiving the message 225, the UE 115-b may transmit the S-SSB burst 230, which may include an S-SSB #0, and S-SSB #1, an S-SSB #2, and an S-SSB #3. In some examples, the slots of the COT for the sidelink message 220 and the S-SSB slots of the COT for the S-SSB burst 230 may be configured based on an indication from the network node 105-a (e.g., received via the communication link 210). Additional details related to using signaling from the UE 115-b or other syncRef nodes to maintain the COT are described with reference to FIGS. 7 and 8 below.

In some examples, the UE 115-a or the UE 115-b may transmit various signaling during the S-SSB slots to maintain the COT. For example, the UE 115-a may transmit S-SSB repetitions as the signaling 215 such that the S-SSB repetitions themselves fill the S-SSB slots. Alternatively, the signaling 215 may include a padding signal or other padding waveform that may fill the S-SSB slots. Additional details related to the signaling transmitted by the UEs 115 to overcome a transmission gap during the S-SSB slots are described with reference to FIGS. 3 through 5 below.

Alternatively, the UEs 115 may apply gap control to the S-SSB slots to maintain the COT. For example, if an S-SSB is to be transmitted in one or more S-SSB slots, the UE 115-a may transmit a padding signal to fill the remaining S-SSB slots. Additional details related to using gap control for filling the S-SSB slots of the COT are described with reference to FIG. 6 below.

By maintaining the COT across the S-SSB slots as described herein, sidelink communications between the UEs 115 may be improved. For example, providing signaling from the UE 115-a (e.g., a COT initiator) or the UE 115-b (e.g., a syncRef node) to fill a gap in a COT created by one or more S-SSB slots may increase signaling throughput and save energy and power for the UEs 115, as the UE 115-a may refrain from performing additional LBT procedures to resume a COT. Additionally, using gap control to maintain the COT may enhance reliability of signaling between the UEs 115 by reducing gaps in a COT, among other benefits.

Figure 3:
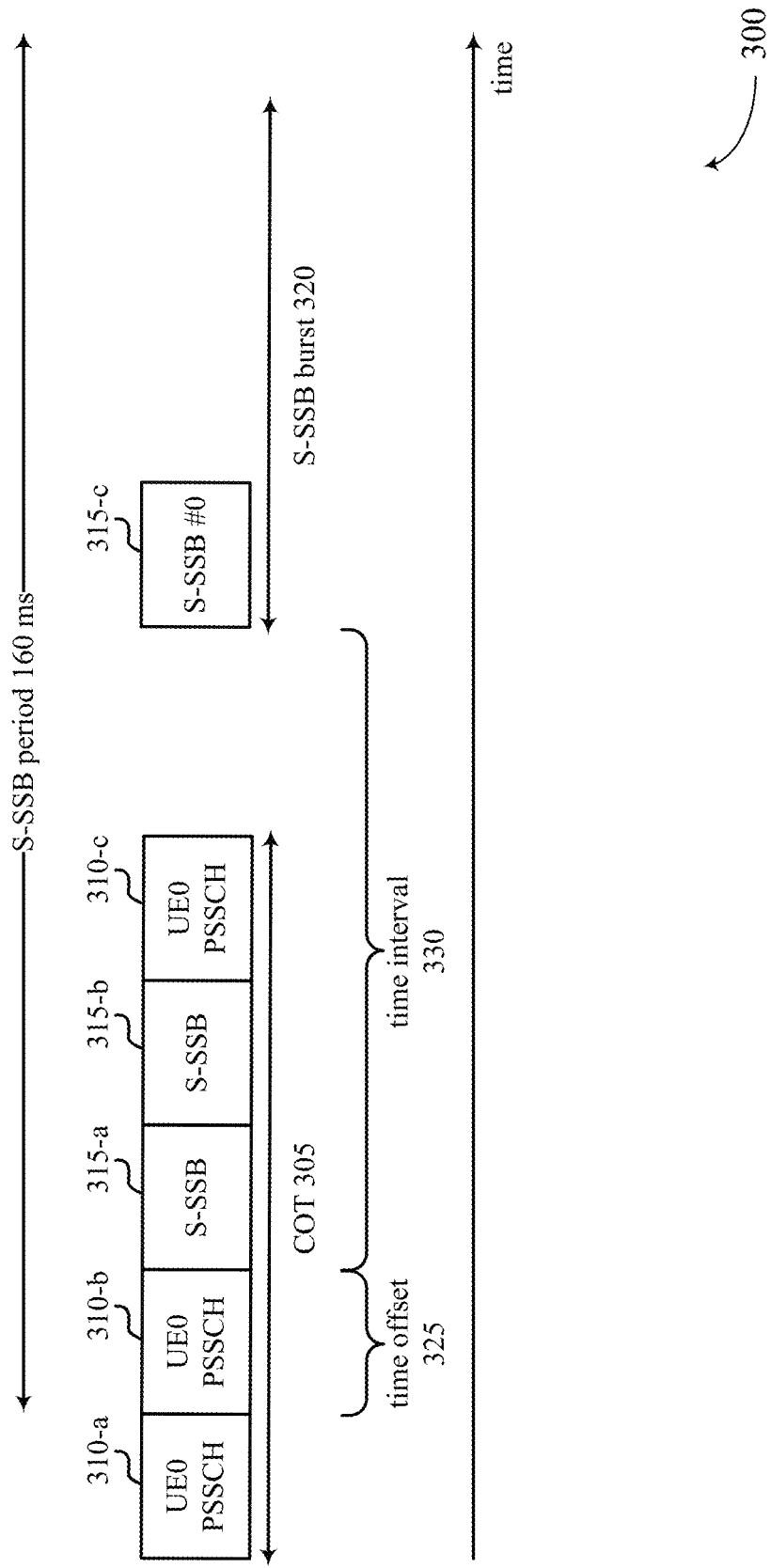
FIGS. 3 and 4 illustrate examples of sidelink transmission schemes that support maintaining COT across S-SSB slots in unlicensed sidelink in accordance with one or more aspects of the present disclosure.

FIG. 3 illustrates an example of a sidelink transmission scheme 300 that supports maintaining a COT across S-SSB slots in unlicensed sidelink in accordance with one or more aspects of the present disclosure. The sidelink transmission scheme 300 may implement or be implemented by aspects of the wireless communications systems 100 and 200 described with reference to FIGS. 1 and 2, respectively. For example, a first UE and a second UE performing unlicensed sidelink communications may use the sidelink transmission scheme 300 to communicate data and maintain a COT 305 across one or more S-SSB slots 315.

As described herein, the first UE (e.g., UE0) may be a COT initiator. That is, the first UE may initiate a COT 305 to perform sidelink data transmissions with the second UE. Additionally, the second UE may be a syncRef node capable of transmitting S-SSBs. In some examples, the second UE or any other syncRef node in wireless communications with the first UE may fill or pad one or more S-SSB slots 315 of the COT 305 such that the COT 305 is maintained across the S-SSB slots 315, which may otherwise create a data transmission gap and subsequently, premature termination of the COT 305.

The first UE may perform an LBT procedure to identify the COT 305 that includes a set of multiple slots for transmitting a sidelink message, such as slots 310 (e.g., configured for PSSCH transmissions by the first UE, UE0). For example, the first UE may transmit a PSSCH (e.g., a UE0 PSSCH) to the second UE via a slot 310-a, a slot 310-b, a slot 310-c, or any combination thereof. The COT 305 may occur during an S-SSB period of 160 ms, where the S-SSB period may include transmission of the COT 305 and an S-SSB burst 320. In some examples, based on determining that one or more slots within the COT 305 are S-SSB slots 315 for S-SSB transmissions, the first UE may transmit signaling to provide transmissions in the S-SSB slots 315, where a gap may occur between the slot 310-b and the slot 310-c due to the S-SSB slot 315. In some examples, the signaling may indicate that the second UE is to provide the transmissions in the S-SSB slots 315.

In some examples, the second UE, which may be a syncRef node, may transmit one or more S-SSBs during the S-SSB slots 315 to maintain the COT 305. Instead of transmitting an S-SSB opportunistically (e.g., in a K earliest S-SSB slot that passes an LBT procedure in a DRS window), an S-SSB slot 315-b (e.g., a new S-SSB slot) may be configured during which the second UE may transmit an S-SSB. For example, the first UE may determine that a first S-SSB is to be transmitted in an S-SSB slot 315-a, which may be a first S-SSB slot of the COT 305 (e.g., S-SSB instance 0), and the first UE may transmit a second S-SSB in at least an S-SSB slot 315 subsequent to the S-SSB slot 315-a, such as the S-SSB slot 315-b. As such, the first UE may repeat an S-SSB waveform in all of the S-SSB slots 315 of the COT 305, where the S-SSB slot 315-a is a nominal S-SSB slot, and where the S-SSB slot 315-b is a newly configured, additional S-SSB slot for maintenance of the COT 305. In this way, the second S-SSB transmitted during the S-SSB slot 315-b may be a repetition of the first S-SSB transmitted during the S-SSB slot 315-a, which may fill or pad the transmission gap.

In some examples, the S-SSB slot 315-a may be offset from the beginning of the S-SSB period of 160 ms by a time offset 325, which may be equal to the length of the slot 310-b. In addition, a first S-SSB transmission (e.g., S-SSB #0) of the S-SSB burst 320 may occur during an S-SSB slot 315-c (e.g., S-SSB instance 1), which may occur a time interval 330 after the beginning of the S-SSB slot 315-a and within the S-SSB period.

In some examples, the second UE may transmit an S-SSB in the S-SSB slot 315-a if the LBT passes. If the second UE acquires the COT 305 before the S-SSB slot 315-a, then the first UE may refrain from performing an additional LBT procedure to perform an S-SSB transmission. Additionally, if the S-SSB slot 315-a is located in the middle of the COT 305, as shown in FIG. 3, the second UE may transmit the first S-SSB in the S-SSB slot 315-a. Based on transmitting the first and second S-SSBs in the S-SSB slot 315-a and the S-SSB slot 315-b, respectively, the first and second UEs may fill the transmission gap created by the S-SSB slots 315, which may enable the first UE to transmit a sidelink message or data (e.g., UE0 PSSCH) to the second UE via the slots 310.

Figure 4:
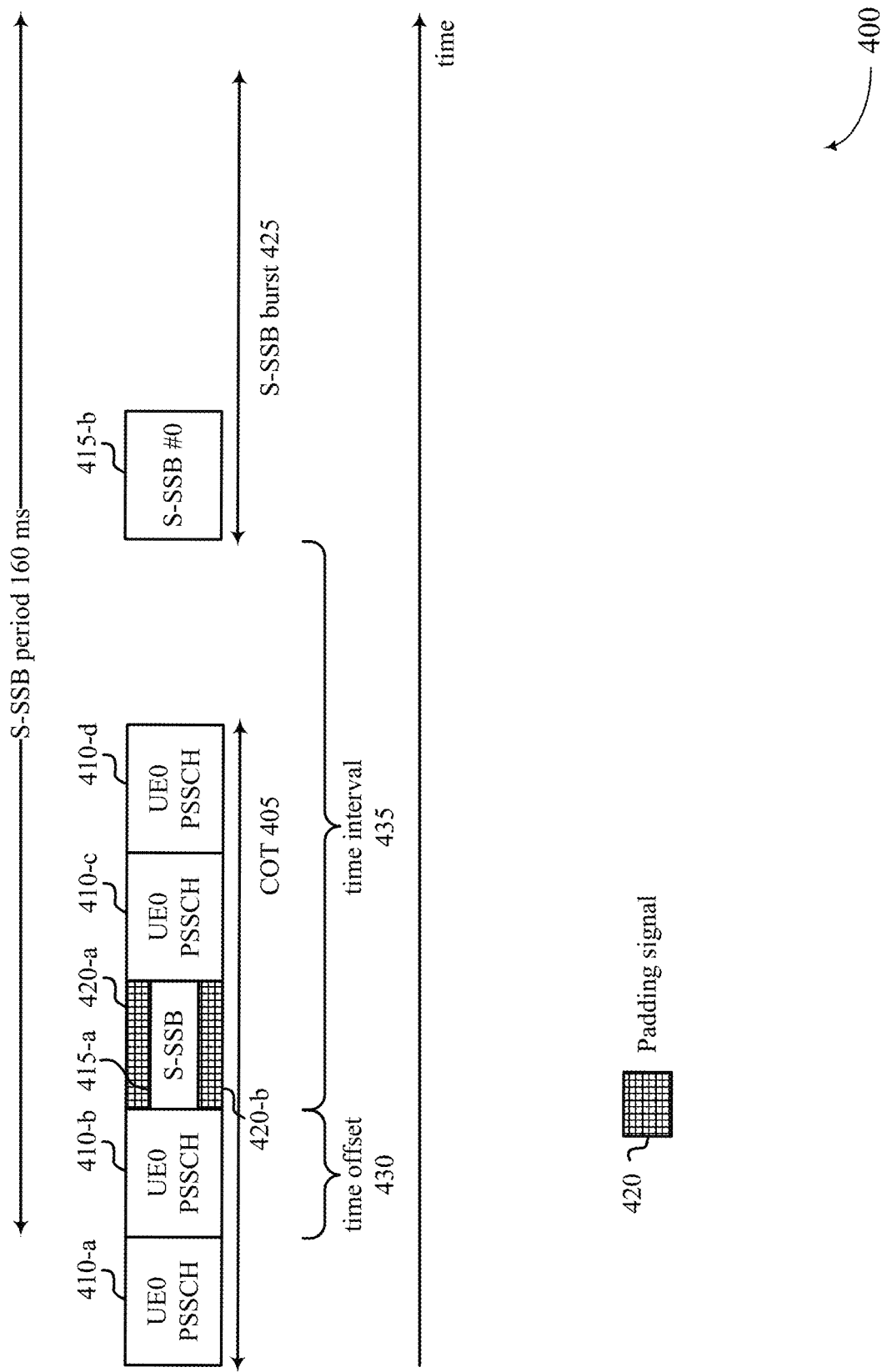

FIG. 4 illustrates an example of a sidelink transmission scheme 400 that supports maintaining a COT across S-SSB slots in unlicensed sidelink in accordance with one or more aspects of the present disclosure. The sidelink transmission scheme 400 may implement or be implemented by aspects of the wireless communications systems 100 and 200 described with reference to FIGS. 1 and 2, respectively. For example, a first UE and a second UE performing unlicensed sidelink communications may use the sidelink transmission scheme 400 to communicate data and maintain a COT 405 across one or more S-SSB slots 415.

As described herein with reference to FIG. 3, the first UE (e.g., UE0) may be a COT initiator. That is, the first UE may initiate a COT 405 to perform sidelink data transmissions with the second UE. Additionally, the second UE may be a non-syncRef node capable of transmitting data (e.g., instead of S-SSBs). In some examples, the first UE may fill or pad one or more S-SSB slots 415 of the COT 405 such that the COT 405 is maintained across the S-SSB slots 415, which may otherwise create a data transmission gap and subsequently, premature termination of the COT 405.

The first UE may perform an LBT procedure to identify the COT 405 that includes a set of multiple slots for transmitting a sidelink message, such as slots 410 (e.g., configured for PSSCH transmissions by the first UE, UE0). For example, the first UE may transmit a PSSCH (e.g., a UE0 PSSCH) to the second UE via a slot 410-a, a slot 410-b, a slot 410-c, and a slot 410-d. The COT 405 may occur during an S-SSB period of 160 ms, where the S-SSB period may include transmission of the COT 405 and an S-SSB burst 425. In some examples, based on determining that one or more slots within the COT 405 are S-SSB slots 415 for S-SSB transmissions, the first UE may transmit signaling to provide transmissions in the S-SSB slots 415, where a gap may occur between the slot 410-b and the slot 410-c due to S-SSB slot 415-a. In some examples, the signaling may indicate that the second UE is to provide the transmissions in the S-SSB slots 415.

As described herein, for unlicensed sidelink communications, the S-SSB slots 415 may be excluded from a resource pool available for use by the first UE. Accordingly, as the COT 405 is across an S-SSB slot 415-a (e.g., S-SSB instance 0), the first UE may transmit a padding signal 420 (e.g., padding waveform) along with the S-SSB slot 415-a to fill the transmission gap via gap control and maintain the COT 405. In some cases, the S-SSB slot 415-*a* (and any additional S-SSB slots of the COT 405) may include NR sidelink S-SSB slots, additional S-SSB slots (e.g., as described with reference to FIG. 3), or a combination thereof.

In some examples, the padding signal 420 may include an S-SSB. For example, a syncRef node (e.g., the second UE) may transmit an S-SSB during the S-SSB slot 415-*a*, where two resource blocks in two edges of the S-SSB transmission may carry the padding signal 420. The two resources blocks may be included on two edges of a subband that is non-overlapping with the S-SSB, which may maintain the COT 405 and fulfill an OCB requirement. For example, if the COT 405 is for a subband, the padding signal 420 may include a first padding signal 420-*a* on a first set of resource blocks adjacent to a first frequency edge of the subband and a second padding signal 420-*b* on a second set of resource blocks adjacent to a second frequency edge of the subband. Transmitting the first padding signal 420-*a* and the second padding signal 420-*b* in this way may prevent interference with the S-SSB transmitted by a syncRef node in the S-SSB slot 415-*a* while maintaining the COT 405.

In some examples, the second UE (e.g., a non-syncRef node) may refrain from monitoring for S-SSBs transmitted from the first UE if the second UE uses a different synchronization reference techniques (e.g., a network node, a global navigation satellite system (GNSS)). Alternatively, the second UE may use other S-SSB instances outside of the COT 405 to synchronize with the first UE. In some examples, the S-SSB slot 415-*a* may be offset from the beginning of the S-SSB period of 160 ms by a time offset 430, which may be equal to the length of the slot 410-*b*. In addition, a first S-SSB transmission (e.g., S-SSB #0) of the S-SSB burst 425 may occur during an S-SSB slot 415-*b* (e.g., S-SSB instance 1), which may occur a time interval 435 after the beginning of the S-SSB slot 415-*a* and within the S-SSB period.

Based on transmitting the S-SSB and the padding signal 420 in the S-SSB slot 415-*a*, the first UE may fill the transmission gap created by the S-SSB slot 415-*a*, which may enable the first UE to transmit a sidelink message or data (e.g., UE0 PSSCH) to the second UE via the slots 410.

Figure 5:
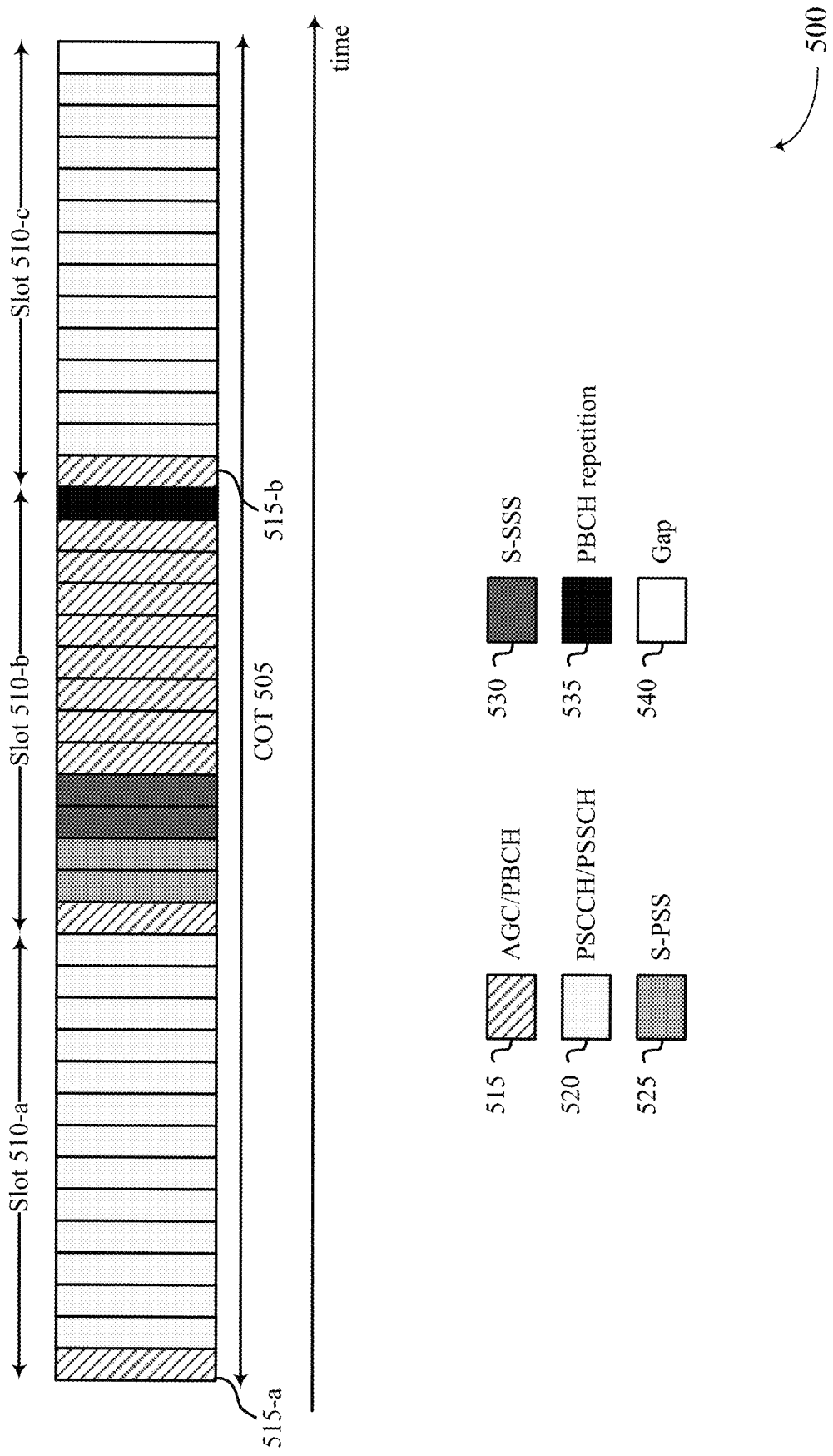
FIG. 5 illustrates an example of an S-SSB structure that supports maintaining COT across S-SSB slots in unlicensed sidelink in accordance with one or more aspects of the present disclosure.

FIG. 5 illustrates an example of an S-SSB structure 500 that supports maintaining a COT across S-SSB slots in unlicensed sidelink in accordance with one or more aspects of the present disclosure. The S-SSB structure 500 may implement or be implemented by aspects of the wireless communications systems 100 and 200 described with reference to FIGS. 1 and 2, respectively. For example, a first UE and a second UE performing unlicensed sidelink communications may communicate the S-SSB structure 500 to provide gap control for filling or padding one or more S-SSB slots within a COT 505.

As described herein, the first UE (e.g., UE0) may be a COT initiator. That is, the first UE may initiate a COT 505 to perform sidelink data transmissions with the second UE. Additionally, the second UE may be a syncRef node capable of transmitting S-SSBs or a non-syncRef node capable of transmitting data (e.g., instead of S-SSBs). In some examples, the first UE may fill or pad one or more S-SSB slots of the COT 505 such that the COT 505 is maintained across the S-SSB slots, which may otherwise create a data transmission gap and subsequently, premature termination of the COT 505.

In some examples, the COT 505 may span a slot 510-*a*, a slot 510-*b*, and a slot 510-*c*, which may each include 14 symbols. The first UE may perform an LBT procedure to identify one or more slots 510 of the COT configured for transmitting a sidelink message to the second UE. For example, the first UE may identify that the slot 510-*a* and the slot 510-*c* include PSSCH/PSCCH symbols 520, during which the first UE may transmit PSSCH or PSCCH transmissions. In addition, the slot 510-*a* may include an automatic gain control (AGC) symbol 515-*a* and the slot 510-*c* may include an AGC symbol 515-*b*, where the AGC symbols 515 may be located in a first symbol of the respective slots 510. In some cases, the last symbol of the slot 510-*c* (e.g., the last symbol of the COT 505) may include a gap symbol 540.

The first UE may determine that one or more slots 510 of the COT are S-SSB slots for S-SSB transmissions. For example, the first UE may determine that the slot 510-*b* is an S-SSB slot, which may occur in the middle of the COT 505 in time. In some examples, the slot 510-*b* may include physical broadcast channel (PBCH) symbols 515, sidelink primary synchronization signal (S-PSS) symbols 525, sidelink secondary synchronization signal (S-SSS) symbols 530, or any combination thereof (e.g., of 14 symbols).

The slot 510-*b* may create a transmission gap between the slot 510-*a* and the slot 510-*c* (e.g., due to the slot 510-*b* being an S-SSB slot in the middle of the COT 505). Accordingly, the UE may transmit signaling to provide transmissions in the slot 510-*b* to fill or pad the gap. Because the first UE may wirelessly communicate with syncRef nodes, non-syncRef nodes, or both, the first UE may use gap control to fill the slot 510-*b* and ensure that any transmission gap remains smaller than 16 µs.

Upon determining that an S-SSB is to be transmitted during the slot 510-*b*, and given that the COT 505 occurs across the slot 510-*b*, the first UE may apply gap control to resolve the gap in the slot 510-*b*. The S-SSB may include any given waveform based on the symbols included in the slot 510-*b* (e.g., the PBCH symbols 515, the S-PSS symbols 525, the S-SSS symbols 530, or any other symbols). In some examples, the first UE may determine that a first S-SSB is to be transmitted in the slot 510-*b* of the COT 505, and thus, the first UE may transmit a padding signal in a last one or more symbol periods of the slot 510-*b*. For example, the padding signal may include a PBCH repetition 535 (e.g., a repetition of a PBCH of the S-SSB transmitted in a PBCH symbol 515 of the slot 510-*b*). The PBCH repetition 535 may pad the gap in the slot 510-*b* such that the gap is smaller than 16 µs.

Alternatively, the padding signal may include a CP extension (CPE) of a signal in a first symbol of the slot 510-*a* (e.g., the first slot of the COT 505) for transmitting the sidelink message, where the slot 510-*a* is repeated immediately subsequent to the slot 510-*b* (e.g., as the slot 510-*c*). For example, the padding signal may include a CPE of the AGC symbol 515-*b* or a first symbol (e.g., #0 symbol) from the slot 510-*c* immediately following the slot 510-*b*.

By using gap control to fill or pad the slot 510-*b* using a PBCH repetition or CPE of an AGC symbol 515 or some other symbol, the first UE may maintain the COT 505 across the slot 510-*b* and continue transmitting a sidelink message (e.g., PSSCH, PSCCH) to the second UE using the slot 510-*c*.

Figure 6:
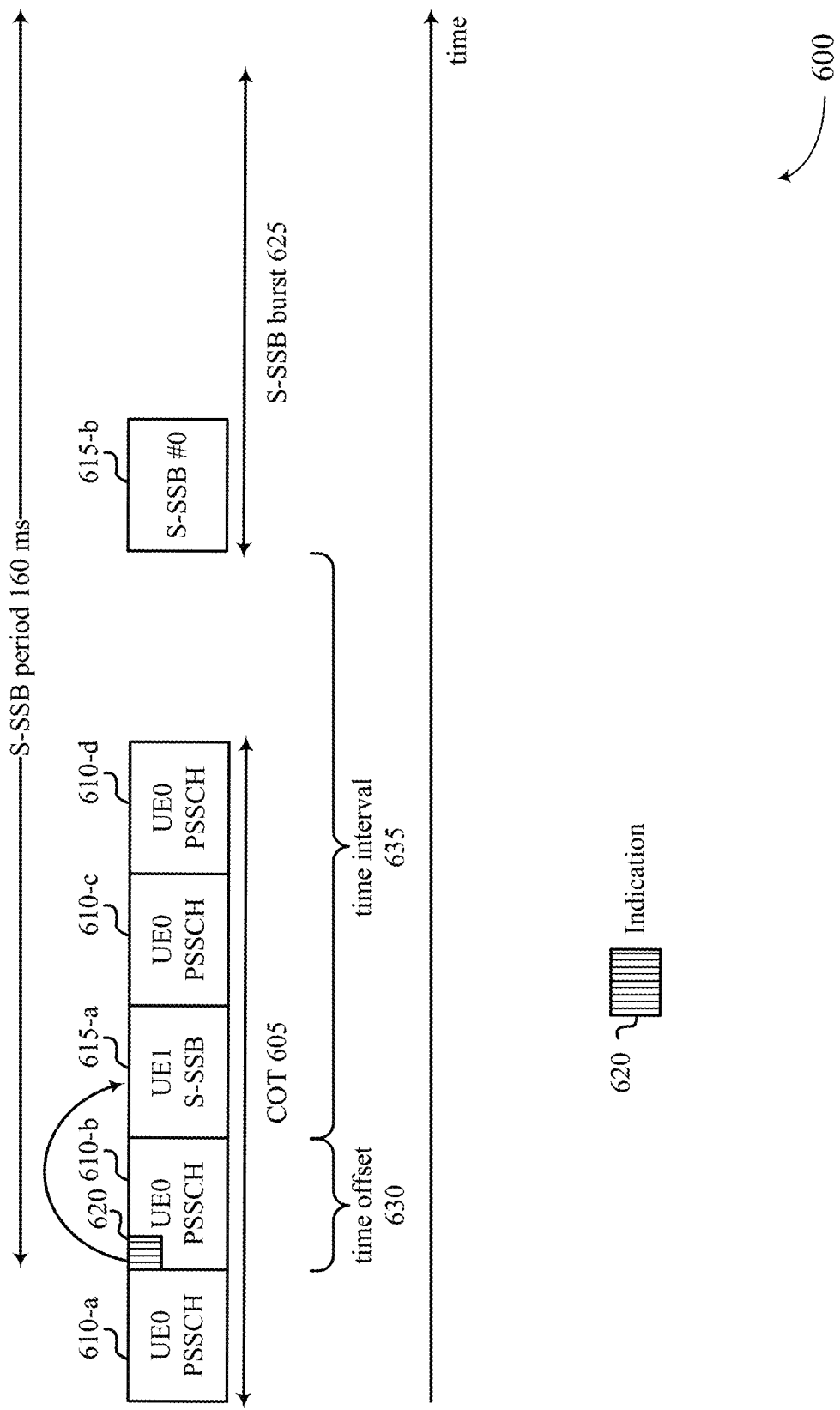
FIG. 6 illustrates an example of a sidelink transmission scheme that supports maintaining COT across S-SSB slots in unlicensed sidelink in accordance with one or more aspects of the present disclosure.

FIG. 6 illustrates an example of a sidelink transmission scheme 600 that supports maintaining a COT across S-SSB slots in unlicensed sidelink in accordance with one or more aspects of the present disclosure. The sidelink transmission scheme 600 may implement or be implemented by aspects of the wireless communications systems 100 and 200 described with reference to FIGS. 1 and 2, respectively. For example, a first UE and a second UE performing unlicensed sidelink communications may use the sidelink transmission scheme 600 to communicate data and maintain a COT 605 across one or more S-SSB slots 615.

As described herein, the first UE (e.g., UE0) may be a COT initiator. That is, the first UE may initiate a COT 605 to perform sidelink data transmissions with the second UE. Additionally, the second UE may be a syncRef node capable of transmitting S-SSBs. In some examples, the second UE may fill or pad one or more S-SSB slots 615 of the COT 605 such that the COT 605 is maintained across the S-SSB slots 615, which may otherwise create a data transmission gap and subsequently, premature termination of the COT 605.

The first UE may perform an LBT procedure to identify the COT 605 that includes a set of multiple slots for transmitting a sidelink message, such as slots 610 (e.g., configured for PSSCH transmissions by the first UE, UE0). For example, the first UE may transmit a PSSCH (e.g., a UE0 PSSCH) to the second UE (e.g., a syncRef node, UE1) via a slot 610-*a*, a slot 610-*b*, a slot 610-*c*, and a slot 610-*d*. The COT 605 may occur during an S-SSB period of 160 ms, where the S-SSB period may include transmission of the COT 605 and an S-SSB burst 625. In some examples, the first UE may transmit control signaling to the second UE indicating which slots within the COT 605 are S-SSB slots 615 configured for S-SSB transmissions.

In some examples, the first UE may transmit a message to the second UE indicating the COT 605 that includes the slots 610 during which the first UE may transmit sidelink messages and the S-SSB slot 615-*a* (e.g., S-SSB instance 0) during which the second UE may transmit an S-SSB. The S-SSB slot 615-*a* may create a transmission gap between the slot 610-*b* and the slot 610-*c*. To account for the gap, the first UE may transmit signaling to provide transmissions in the S-SSB slot 615-*a* and any additional S-SSB slots of the COT 605. In some examples, the signaling may indicate that the second UE is to provide the transmissions in the S-SSB slots 615. For example, if the first UE detects one or more syncRef nodes (e.g., including the second UE) transmitting S-SSBs, the first UE may use the S-SSBs transmitted by the one or more syncRef nodes to pad the gap instead of transmitting a padding signal itself. In some cases, if the first UE (e.g., the COT initiator) is not a syncRef node, the first UE may share the COT 605 with the second UE, which may ensure that the second UE transmits an S-SSB even if an LBT passes.

The first UE may transmit an indication 620 for the second UE to transmit an S-SSB in the S-SSB slot 615-*a* (e.g., and any other quantity of S-SSBs in corresponding S-SSB slots 615). The indication 620 may include a type of LBT procedure associated with the COT 605. If the first UE detects one or more syncRef nodes, the first UE may share the COT 605 with the syncRef nodes, schedule an S-SSB transmission by the second UE (e.g., UE1 S-SSB) during the S-SSB slot 615-*a*, and resume the COT 605 after the S-SSB slot 615-*a* in the slot 610-*c* and the slot 615-*d*. Because the S-SSB transmission by the second UE is scheduled by the first UE, the COT 605 may be maintained.

The first UE may use the indication 620 to share the COT 605 with the second UE and any other syncRef nodes in communication with the first UE. The first UE may schedule one or more S-SSB transmissions for the second UE in one or more S-SSB slots 615 of the COT 605, such as the S-SSB slot 615-*a*. If the S-SSB slot 615-*a* is an NR sidelink S-SSB slot, the second UE may perform the S-SSB transmission autonomously. That is, if the LBT procedure by the first UE is successful, then the second UE may already be configured to transmit an S-SSB in the S-SSB slot 615-*a*.

In some examples, the COT 605 may include multiple, additional S-SSB slots in addition to the S-SSB slot 615-*a*. In some cases, the first UE may schedule the second UE to repeat S-SSB transmissions in each of the additional S-SSB slots. That is, the second UE may transmit one or more repetitions of an S-SSB during one or more S-SSB slots 615 within the COT 605. Alternatively, the first UE may statically disable any S-SSB slots 615 of the COT 605 other than the S-SSB slot 615-*a*. The second UE may receive an indication from the first UE that the second UE is to disable transmission of one or more S-SSBs in one or more additional S-SSB slots. For example, if a one-shot LBT procedure applies to S-SSB transmissions in particular bands or regions, the first UE may disable any additional S-SSB slots that apply to different bands or regions, and the second UE may transmit one S-SSB in the S-SSB slot 615-*a*.

In some other examples, the first UE may include any additional S-SSB slots in a resource pool for use by the second UE. The first UE may multiplex other sidelink signaling (e.g., FDM) in one or more additional S-SSB slots to maintain the COT 605. For example, the first UE may transmit, in the S-SSB slot 615-*a* and any additional S-SSB slots of the COT 605, sidelink signals that are multiplexed with frequency resources allocated to the S-SSBs scheduled for transmission by the second UE.

The second UE may transmit one or more S-SSBs during the S-SSB slot 615-*a* and in some cases, one or more additional S-SSB slots, based on receiving the indication 620 from the first UE. The second UE may transmit an S-SSB in the S-SSB slot 615-*a* autonomously, whether the S-SSB slot 615-*a* is within or outside of the COT 605. The first UE may resume the COT 605 in the slot 610-*c* and the slot 610-*d* after the S-SSB slot 615-*a*.

In some examples, the second UE may transmit an S-SSB in the first S-SSB slot of the COT 605 which clears an LBT procedure performed by the first UE in a DRS window. As such, the second UE may refrain from transmitting an S-SSB in additional S-SSB slots other than the S-SSB slot 615-*a*. If there are multiple S-SSB slots 615 within the COT 605, the first UE may indicate that the second UE is to repeat a same S-SSB transmission in the S-SSB slot 615-*a* and any additional S-SSB slots of the COT 605. For example, the first UE may transmit an indication for the second UE to transmit a repetition of the S-SSB to span the S-SSB slot 615-*a* and any additional S-SSB slots of the COT 605 that are configured for S-SSB transmissions.

In some examples, the indication transmitted by the first UE may include COT system information (COT-SI) or sidelink control information (SCI). In some examples, the first UE may transmit the COT-SI to the second UE to indicate which additional S-SSB slots may be used for transmitting an S-SSB. The COT-SI may signal a COT duration and a part of the COT 605 which the first UE may use. Based on the indication of the part of the COT 605, the second UE may determine which one or more additional S-SSB slots may be in the middle of the COT 605, and may repeat the S-SSB in those additional S-SSB slots.

Alternatively, the first UE may transmit the SCI to indicate a quantity of S-SSB slots 615 during which the second UE is to transmit S-SSBs to maintain the COT 605. The SCI may be piggybacked in a data-scheduling SCI for the COT 605. In some examples, the first UE may transmit the SCI a quantity of X slots before the S-SSB slot 615 indicated in the SCI to provide the second UE some processing time. Additionally, the first UE may transmit multiple COT-SIs, multiple SCIs, or both that include S-SSB scheduling information.

In some examples, the S-SSB slot 615-*a* may be offset from the beginning of the S-SSB period of 160 ms by a time offset 630, which may be equal to the length of the slot 610-*b*. In addition, a first S-SSB transmission (e.g., S-SSB #0) of the S-SSB burst 625 may occur during an S-SSB slot 615-*b* (e.g., S-SSB instance 1), which may occur a time interval 635 after the beginning of the S-SSB slot 615-*a* and within the S-SSB period. Based on sharing the COT 605 with the second UE and enabling the second UE to transmit an S-SSB in the S-SSB slot 615-*b* to fill the transmission gap, the first UE may transmit a sidelink message or data (e.g., UE0 PSSCH) to the second UE via the slots 610.

Figure 7:
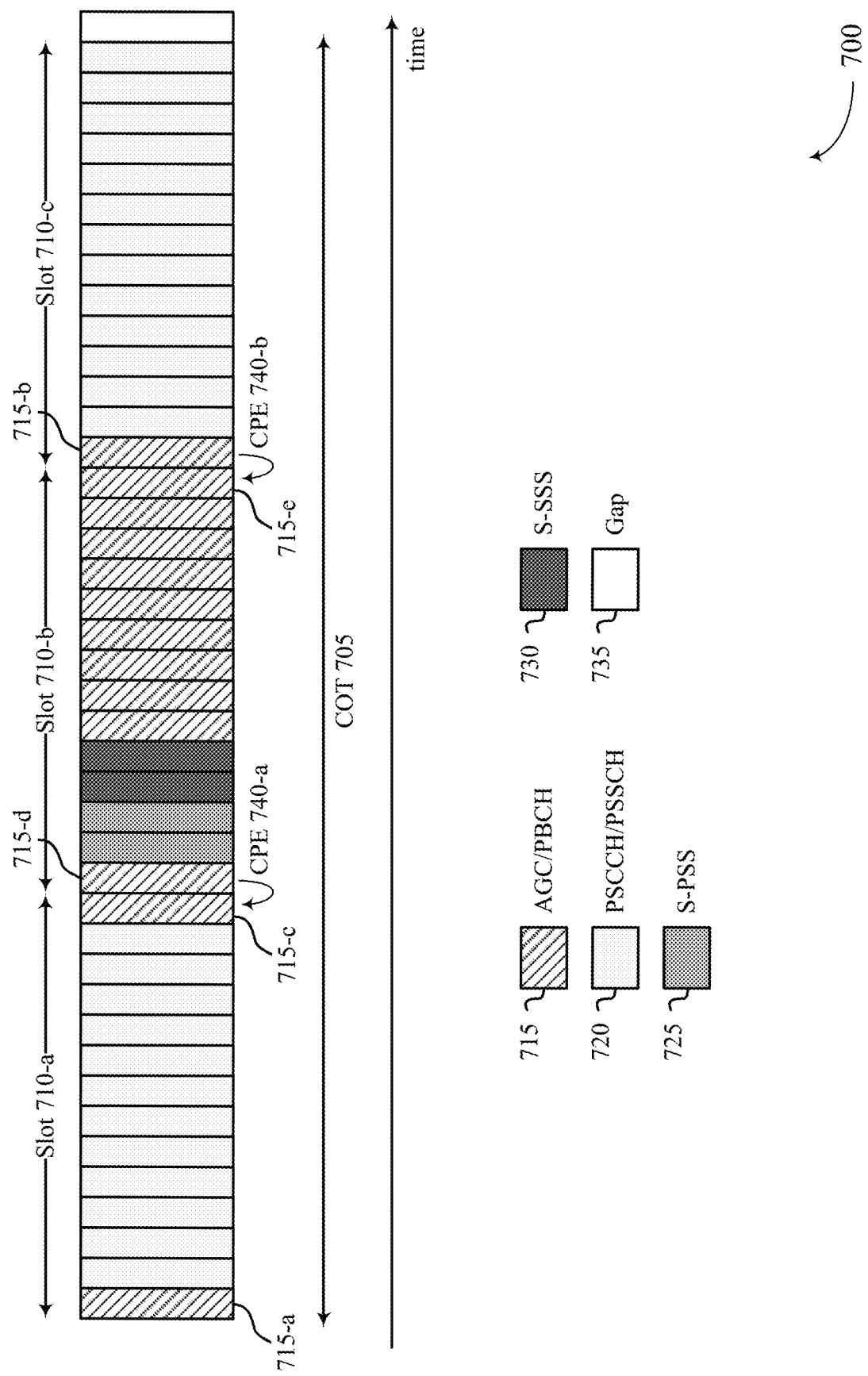
FIG. 7 illustrates an example of an S-SSB structure that supports maintaining COT across S-SSB slots in unlicensed sidelink in accordance with one or more aspects of the present disclosure.

FIG. 7 illustrates an example of an S-SSB structure 700 that supports maintaining a COT across S-SSB slots in unlicensed sidelink in accordance with one or more aspects of the present disclosure. The S-SSB structure 700 may implement or be implemented by aspects of the wireless communications systems 100 and 200 described with reference to FIGS. 1 and 2, respectively. For example, a first UE and a second UE performing unlicensed sidelink communications may communicate the S-SSB structure 700 to provide gap control for filling (e.g., padding) one or more S-SSB slots within a COT 705.

As described herein, the first UE (e.g., UE0) may be a COT initiator. That is, the first UE may initiate a COT 705 to perform sidelink data transmissions with the second UE. Additionally, the second UE may be a syncRef node capable of transmitting S-SSBs. In some examples, the UEs may fill or pad one or more S-SSB slots of the COT 705 such that the COT 705 is maintained across the S-SSB slots, which may otherwise create a data transmission gap and subsequently, premature termination of the COT 705.

In some examples, the COT 705 may span a slot 710-*a*, a slot 710-*b*, and a slot 710-*c*, which may each include 14 symbols. The first UE may perform an LBT procedure to identify one or more slots 710 of the COT 705 configured for transmitting a sidelink message to the second UE. For example, the first UE may identify that the slot 710-*a* and the slot 710-*b* include PSSCH/PSCCH symbols 720, during which the first UE may transmit PSSCH or PSCCH transmissions. In addition, the slot 710-*a* may include an AGC symbol 715-*a* and the slot 710-*c* may include an AGC symbol 715-*b*, where the AGC symbols 715 may be located in a first symbol of the respective slots 710. In some cases, the last symbol of the slot 710-*c* (e.g., the last symbol of the COT 705) may include a gap symbol 735.

The first UE may determine that one or more slots 710 of the COT are S-SSB slots for S-SSB transmissions. For example, the first UE may determine that the slot 710-*b* is an S-SSB slot, which may occur in the middle of the COT 705 in time. In some examples, the slot 710-*b* may include PBCH symbols 715, S-PSS symbols 725, S-SSS symbols 730, or any combination thereof (e.g., of 14 symbols).

The slot 710-*b* may create a gap between the slot 710-*a* and the slot 710-*c* (e.g., due to the slot 710-*b* being an S-SSB slot in the middle of the COT 705). Accordingly, the UE may transmit signaling to provide transmissions in the slot 710-*b* to fill or pad the gap. In some examples, as described with reference to FIG. 6, the first UE may identify the second UE and other syncRef nodes that transmit S-SSBs. To utilize the S-SSBs transmitted by the second UE or another syncRef node to fill the gap and maintain the COT 705, the first UE may transmit the signaling and share the COT 705 with the second UE. The first UE may then schedule an S-SSB transmission by the second UE in the slot 710-*b*, and the first UE may resume the COT 705 after the slot 710-*b* across the slot 710-*c*.

In some examples, in sharing the COT 705 with the second UE, the first UE may apply gap control prior to the slot 710-*b* in which the second UE is scheduled to transmit an S-SSB. The first UE may close the last symbol of the slot 710-*a* (e.g., the slot 710-*a* immediately before the slot 710-*b*) to ensure that the transmission gap of the COT 705 is smaller than 16 μs such that the COT 705 may be maintained.

In some cases, the first UE may partially fill the gap in the slot 710-*b* using a CPE 740 of an S-SSB transmitted in a last symbol (e.g., symbol #13) of a previous slot. For example, the first UE may transmit an indication to the second UE for the second UE to transmit the CPE 740-*a* of a signal in a last symbol (e.g., a PBCH symbol 715-*c*) of the slot 710-*a* that immediately precedes a first symbol (e.g., a PBCH symbol 715-*d*) of the slot 710-*b*, where the signal is of an S-SSB that is in a first symbol (e.g., the PBCH symbol 715-*d*) of the slot 710-*b*.

Alternatively, in applying gap control prior to the slot 710-*b*, the first UE may rate ratch a signal to the last symbol (e.g., symbol #13) of the slot 710-*a*. For example, the first UE may transmit an indication for the second UE to rate match a PBCH from a first symbol of the slot 710-*b* (e.g., the PBCH symbol 715-*d*) to a last symbol of the slot 710-*a* (e.g., the PBCH symbol 715-*c*) that immediately precedes the first symbol of the slot 710-*b*. In the case of rate matching, the UEs may refrain from performing transmit or receive switching as the first UE may refrain from monitoring for S-SSBs within the COT 705.

In some examples, instead of applying gap control prior to the slot 710-*b*, the first UE may apply gap control to close an ending transmit or receive gap to no more than 16 μs at the slot 710-*b*. For example, the first UE may apply a CPE 740-*b* at a first symbol (e.g., symbol #0) from the slot 710-*c* immediately following the slot 710-*b* to the last symbol (e.g., symbol #13) from the slot 710-*b*. That is, the first UE may apply the CPE 740-*a* at the AGC symbol 715-*b* from the slot 710-*c* to the AGC symbol 715-*e* from the slot 710-*b*. Alternatively, the first UE may rate match a PBCH to fill the last symbol (e.g., symbol #13) of the slot 710-*b*. For example, the first UE may transmit an indication for the second UE to rate match a PBCH signal from a first symbol of the slot 710-*b* (e.g., the PBCH symbol 715-*d*) to a last symbol of the slot 710-*a* (e.g., the PBCH symbol 715-*c*) that immediately precedes the first symbol of the slot 710-*b*. In some cases, the first UE may schedule the second UE or another syncRef node to perform the rate matching.

In some cases, the first UE may indicate an LBT type for an S-SSB transmission and for CPE or rate matching of one or more symbols of an S-SSB slot to close a transmit or receive gap before and at the end of the S-SSB slot. For example, the first UE may transmit an indication to the second UE, the indication of a type of the LBT procedure performed by the first UE to identify the COT 705, and an indication of a gap control procedure (e.g., the CPE, the rate matching, or some other gap control procedure) for an end of an S-SSB scheduled to be transmitted by the second UE. In some examples, the first UE may transmit COT-SI or SCI to indicate the LBT type of the S-SSB transmission to the second UE.

The indicated LBT type may match to a gap duration. For example, if the gap is less than 16 μs, the LBT type may be an LBT type 2C. If the gap is equal to 16 μs, the LBT type may be an LBT type 2B. Additionally, or alternatively, the second UE and any other syncRef nodes may be configured (e.g., by a network node) to perform some type of LBT procedure for S-SSB transmissions (e.g., a category 4 or category 2 LBT type). In some cases where first UE shares the COT 705 with the second UE, the second UE may upgrade the LBT procedure to the LBT type indicated in the SCI. In some cases, the first UE may transmit the COT-SI or the SCI to indicate a gap control procedure used in the slot 710-b. For example, the COT-SI or the SCI may indicate a CPE duration before the slot 710-b or a rate matching used in the end of the slot 710-b depending on which form of gap control was used before or at the end of the slot 710-b.

The first UE may signal a combination of the LBT type and the gap control procedure used in the slot 710-b via SCI, which may be transmitted a quantity of X slots before the slot 710-b. For example, if X=1, the first UE may transmit the SCI in a slot immediately before the slot 710-b (e.g., the slot 710-a) to provide the LBT type and the gap control procedure for the slot 710-b. The LBT type and the gap control procedure may be piggybacked in a data-scheduling SCI. In some examples, the SCI may be grant-based.

Alternatively, the first UE may signal the combination of the LBT type and the gap control procedure used in the slot 710-b via COT-SI. The COT-SI may include one or more fields for the LBT type and the gap control procedure of one or more S-SSB transmissions in the slot 710-b and any other S-SSB slots within the COT 705. In some examples, there may be multiple S-SSB slots within the COT 705, which may each correspond to independent LBT type fields, gap control procedure fields, or both.

By using gap control to fill or pad the slot 710-b using the gap control techniques described herein, the first UE may maintain the COT 705 across the slot 710-b and continue transmitting sidelink messages (e.g., PSSCH, PSCCH) to the second UE using the slot 710-c.

Figure 8:
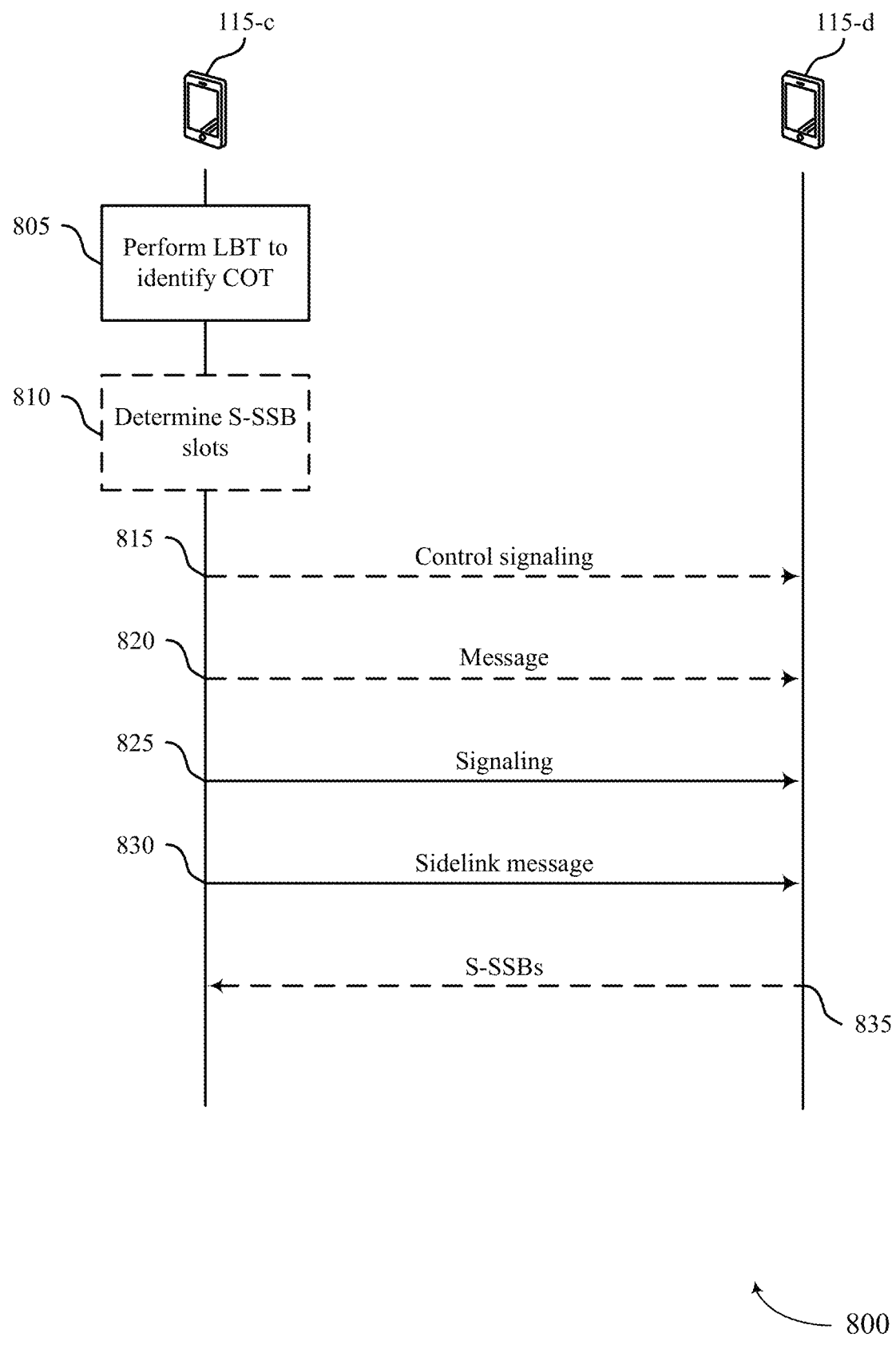
FIG. 8 illustrates an example of a process flow that supports maintaining COT across S-SSB slots in unlicensed sidelink in accordance with one or more aspects of the present disclosure.

FIG. 8 illustrates an example of a process flow 800 that supports maintaining a COT across S-SSB slots in unlicensed sidelink in accordance with one or more aspects of the present disclosure. The process flow 800 may implement aspects of wireless communications systems 100 and 200, or may be implemented by aspects of the wireless communications system 100 and 200. For example, the process flow 800 may illustrate operations between a UE 115-c and a UE 115-d, which may be examples of corresponding devices described herein. In the following description of the process flow 800, the operations between the UE 115-c and the UE 115-d may be transmitted in a different order than the example order shown, or the operations performed by the UE 115-c and the UE 115-d may be performed in different orders or at different times. Some operations may also be omitted from the process flow 800, and other operations may be added to the process flow 800.

At 805, the UE 115-c (e.g., a first UE, a COT initiator) may perform an LBT procedure to identify a COT that includes a set of multiple slots for transmitting a sidelink message. The sidelink message may include a PSSCH, a PSCCH, or other sidelink signaling between the UE 115-c and the UE 115-d.

At 810, the UE 115-c may determine that one or more slots that are within the COT are for S-SSBs. That is, the COT may include some slots for sidelink messages and some S-SSB slots for S-SSBs, where the S-SSB slots may create a transmission gap between slots for sidelink messages if left unfilled or unpadded.

At 815, the UE 115-c may transmit, to the UE 115-d (e.g., a second UE, a syncRef node), control signaling identifying the one or more slots for the S-SSBs. If it is indicated to the UE 115-d, the UE 115-d may transmit one or more S-SSBs in the one or more slots.

At 820, the UE 115-c may transmit, to the UE 115-d, a message indicating a COT that includes the set of multiple slots for the UE 115-c to use to transmit a sidelink message and indicating the one or more slots during which the UE 115-b is to transmit one or more S-SSBs, the one or more slots being within the COT. In some examples, the message may indicate that the UE 115-c is sharing the COT with the UE 115-d such that the UE 115-d may transmit signaling to pad the transmission gap in the one or more slots for the S-SSBs.

At 825, the UE 115-c may transmit signaling to provide transmissions in the one or more slots for S-SSBs. In some examples, the signaling may include a padding signal, which may pad the transmission gap created by the one or more slots. Alternatively, the signaling may indicate that the UE 115-d is to transmit signaling to provide transmissions in the one or more slots. For example, the signaling may indicate that the UE 115-d is to transmit one or more S-SSBs in the one or more slots. In some examples, the UE 115-c may use gap control to pad the transmission gap.

At 830, the UE 115-c may transmit, to the UE 115-d, the sidelink message in the set of multiple slots of the COT for the sidelink message. That is, by padding the transmission gap, the UE 115-c may maintain the COT and resume sidelink message transmissions during the COT (e.g., excluding the one or more slots for S-SSBs).

At 835, the UE 115-d may transmit the one or more S-SSBs during the one or more slots for the S-SSBs based on receiving the message from the UE 115-c. That is, if the UE 115-c shared the COT with the UE 115-d and indicated that the UE 115-d is to provide signaling (e.g., S-SSBs) to pad the transmission gap in the one or more slots, the UE 115-d may transmit the one or more S-SSBs and maintain the COT.

Figure 9:
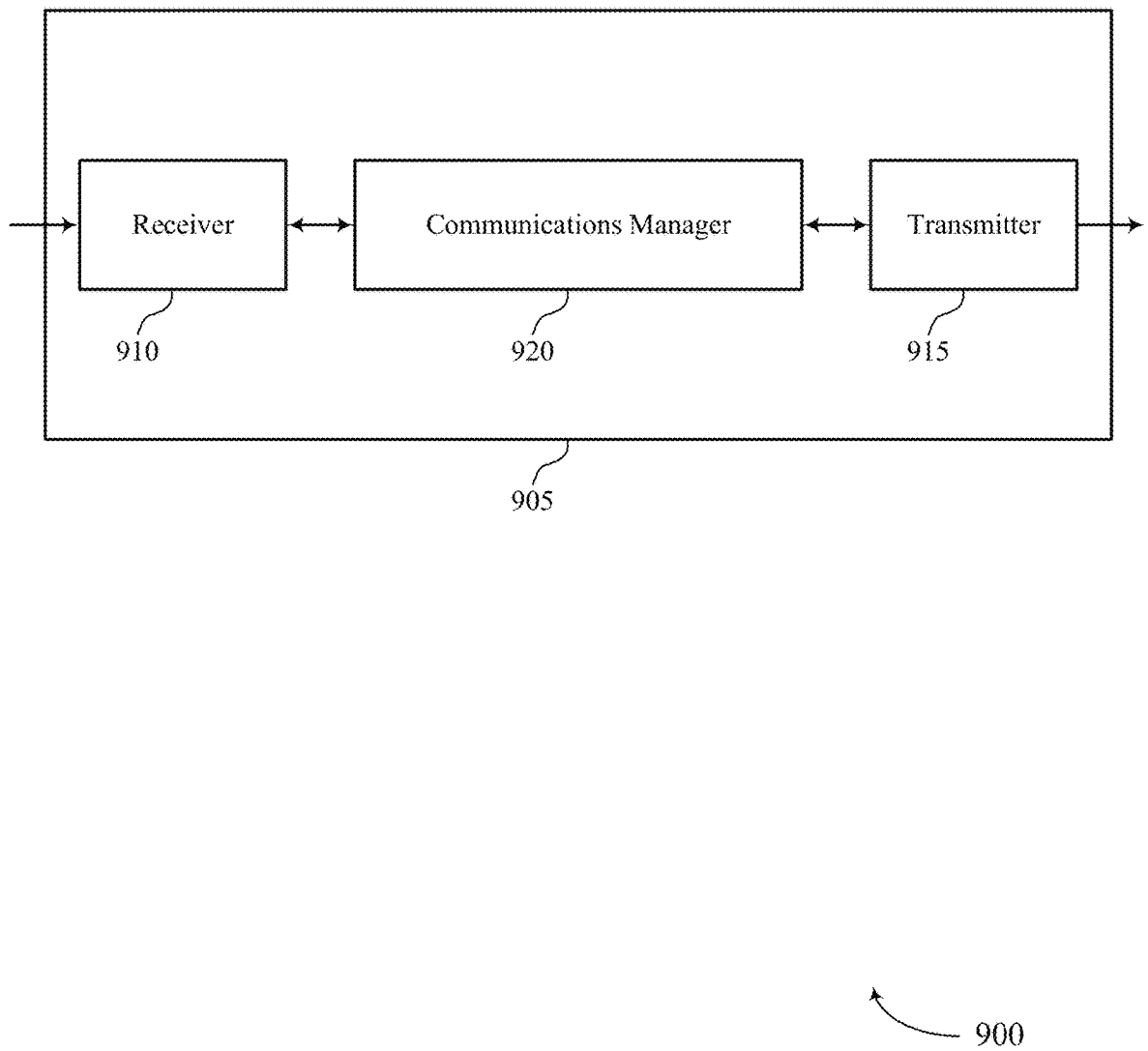
FIGS. 9 and 10 show block diagrams of devices that support maintaining COT across S-SSB slots in unlicensed sidelink in accordance with one or more aspects of the present disclosure.

FIG. 9 shows a block diagram 900 of a device 905 that supports maintaining a COT across S-SSB slots in unlicensed sidelink in accordance with one or more aspects of the present disclosure. The device 905 may be an example of aspects of a UE 115 as described herein. The device 905 may include a receiver 910, a transmitter 915, and a communications manager 920. The device 905 may also include one or more processors, memory coupled with the one or more processors, and instructions stored in the memory that are executable by the one or more processors to enable the one or more processors to perform the COT maintenance features discussed herein. Each of these components may be in communication with one another (e.g., via one or more buses).

The receiver 910 may provide a means for receiving information such as packets, user data, control information, or any combination thereof associated with various information channels (e.g., control channels, data channels, information channels related to maintaining a COT across S-SSB slots in unlicensed sidelink). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to maintaining a COT across S-SSB slots in unlicensed sidelink). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of maintaining a COT across S-SSB slots in unlicensed sidelink as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a first UE in accordance with examples as disclosed herein. For example, the communications manager 920 may be configured as or otherwise support a means for performing an LBT procedure to identify a COT that includes a set of multiple slots for transmitting a sidelink message. The communications manager 920 may be configured as or otherwise support a means for transmitting signaling to provide transmissions in one or more slots that are within the COT based on determining that the one or more slots are for S-SSBs. The communications manager 920 may be configured as or otherwise support a means for transmitting, to a second UE, the sidelink message in the set of multiple slots of the COT.

Additionally, or alternatively, the communications manager 920 may support wireless communication at a second UE in accordance with examples as disclosed herein. For example, the communications manager 920 may be configured as or otherwise support a means for receiving control signaling identifying a set of slots for S-SSBs. The communications manager 920 may be configured as or otherwise support a means for receiving, from a first UE, a message indicating a COT that includes a set of multiple slots for the first UE to use to transmit a sidelink message and indicating one or more slots of the set of slots during which the second UE is to transmit one or more S-SSBs, the one or more slots being within the COT. The communications manager 920 may be configured as or otherwise support a means for transmitting the one or more S-SSBs during the one or more slots based on the message receiving from the first UE.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for maintaining a COT across S-SSB slots in unlicensed sidelink, which may increase signaling throughput and decrease power and energy consumption.

Figure 10:
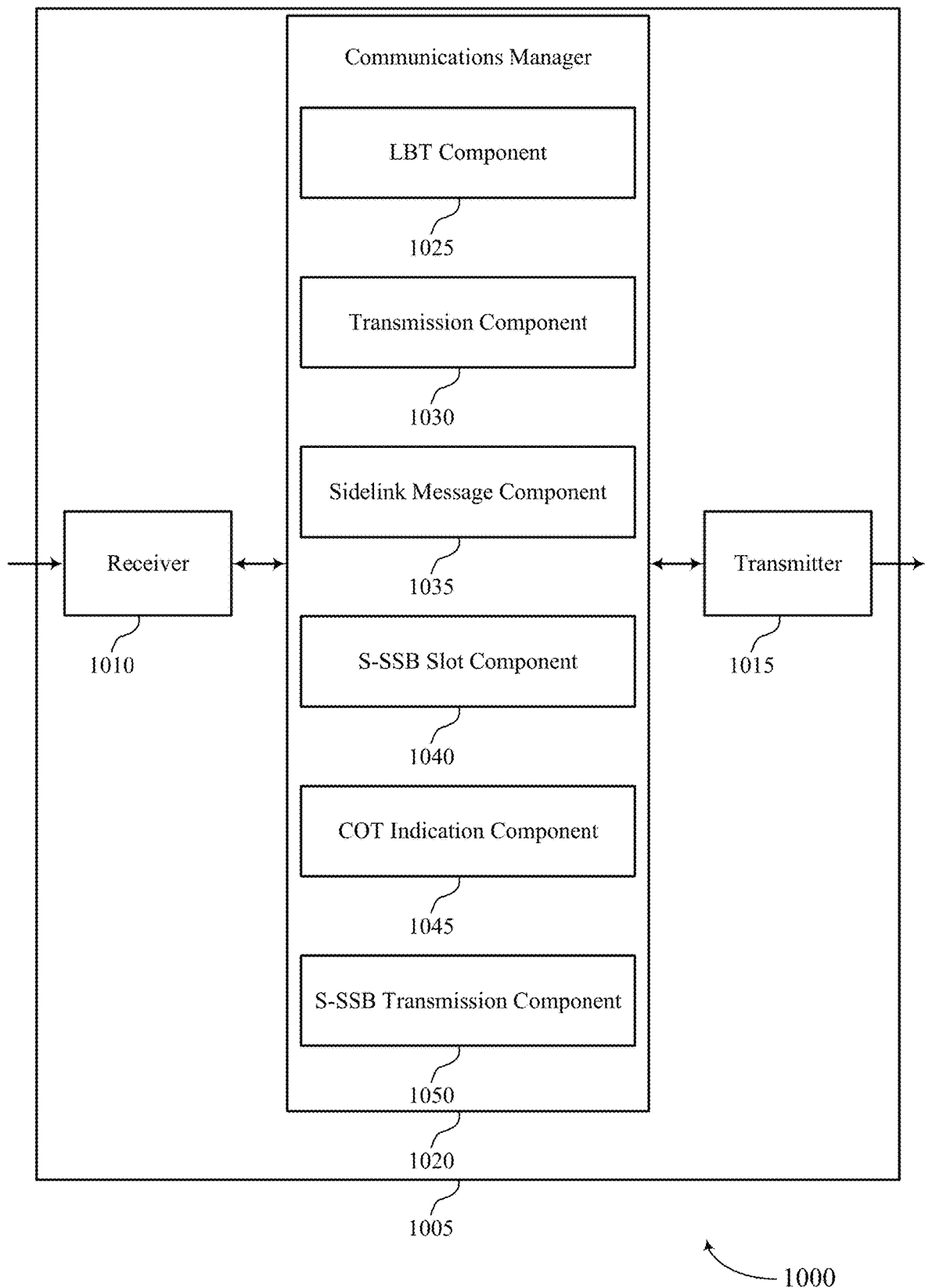

FIG. 10 shows a block diagram 1000 of a device 1005 that supports maintaining a COT across S-SSB slots in unlicensed sidelink in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to maintaining a COT across S-SSB slots in unlicensed sidelink). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to maintaining a COT across S-SSB slots in unlicensed sidelink). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of maintaining a COT across S-SSB slots in unlicensed sidelink as described herein. For example, the communications manager 1020 may include an LBT component 1025, a transmission component 1030, a sidelink message component 1035, an S-SSB slot component 1040, a COT indication component 1045, an S-SSB transmission component 1050, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a first UE in accordance with examples as disclosed herein. The LBT component 1025 may be configured as or otherwise support a means for performing an LBT procedure to identify a COT that includes a set of multiple slots for transmitting a sidelink message. The transmission component 1030 may be configured as or otherwise support a means for transmitting signaling to provide transmissions in one or more slots that are within the COT based on determining that the one or more slots are for S-SSBs. The sidelink message component 1035 may be configured as or otherwise support a means for transmitting, to a second UE, the sidelink message in the set of multiple slots of the COT.

Additionally, or alternatively, the communications manager 1020 may support wireless communication at a second UE in accordance with examples as disclosed herein. The S-SSB slot component 1040 may be configured as or otherwise support a means for receiving control signaling identifying a set of slots for S-SSBs. The COT indication component 1045 may be configured as or otherwise support a means for receiving, from a first UE, a message indicating a COT that includes a set of multiple slots for the first UE to use to transmit a sidelink message and indicating one or more slots of the set of slots during which the second UE is to transmit one or more S-SSBs, the one or more slots being within the COT. The S-SSB transmission component 1050 may be configured as or otherwise support a means for transmitting the one or more S-SSBs during the one or more slots based on the message receiving from the first UE.

In some cases, the LBT component 1025, the transmission component 1030, the sidelink message component 1035, the S-SSB slot component 1040, the COT indication component 1045, and the S-SSB transmission component 1050 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the LBT component 1025, the transmission component 1030, the sidelink message component 1035, the S-SSB slot component 1040, the COT indication component 1045, and the S-SSB transmission component 1050 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 11:
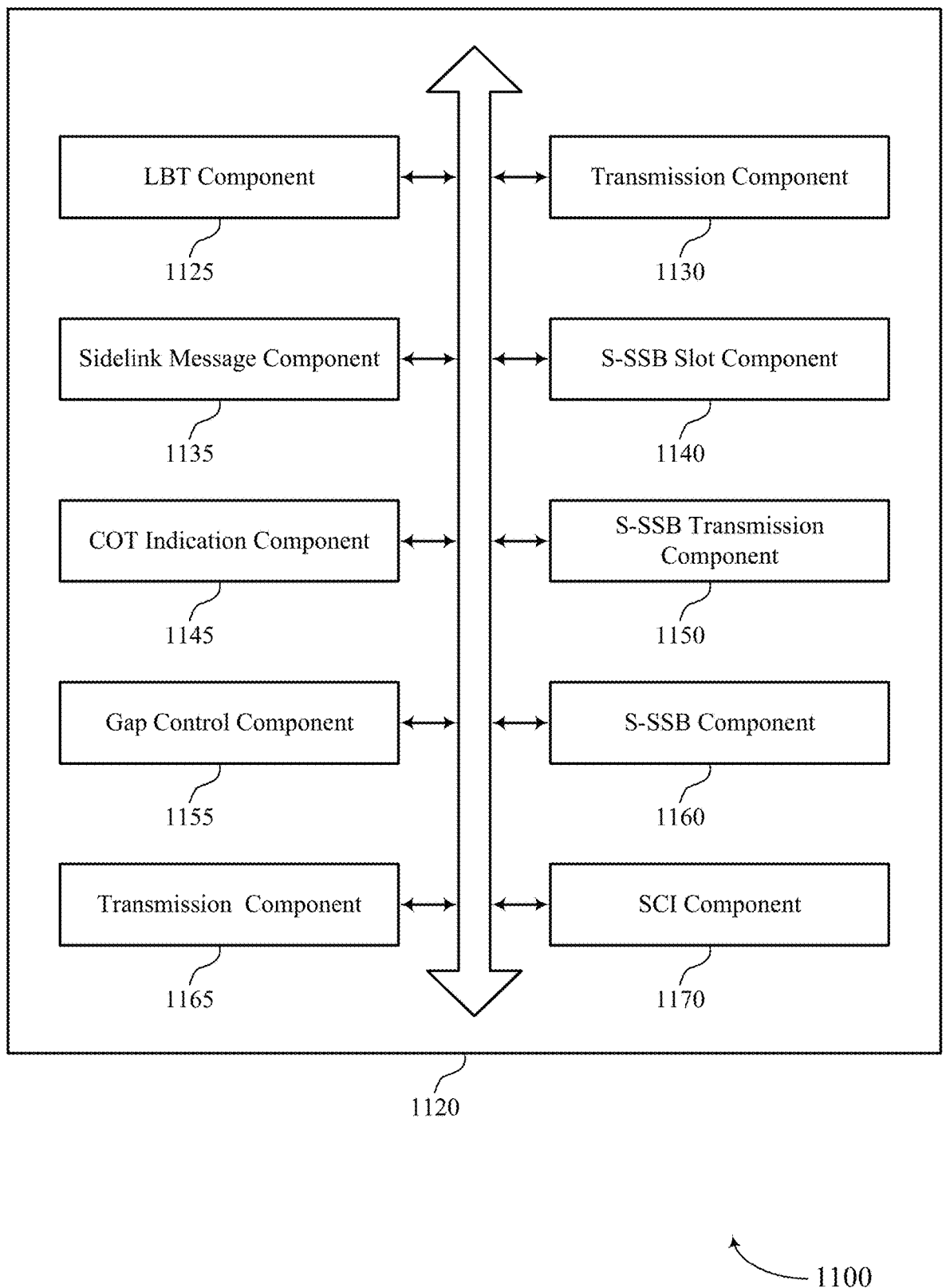
FIG. 11 shows a block diagram of a communications manager that supports maintaining COT across S-SSB slots in unlicensed sidelink in accordance with one or more aspects of the present disclosure.

FIG. 11 shows a block diagram 1100 of a communications manager 1120 that supports maintaining a COT across S-SSB slots in unlicensed sidelink in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of maintaining a COT across S-SSB slots in unlicensed sidelink as described herein. For example, the communications manager 1120 may include an LBT component 1125, a transmission component 1130, a sidelink message component 1135, an S-SSB slot component 1140, a COT indication component 1145, an S-SSB transmission component 1150, a gap control component 1155, an S-SSB component 1160, a transmission component 1165, an SCI component 1170, or any combination thereof. Each of these components may communicate, directly or indirectly, with one another (e.g., via one or more buses).

The communications manager 1120 may support wireless communication at a first UE in accordance with examples as disclosed herein. The LBT component 1125 may be configured as or otherwise support a means for performing an LBT procedure to identify a COT that includes a set of multiple slots for transmitting a sidelink message. The transmission component 1130 may be configured as or otherwise support a means for transmitting signaling to provide transmissions in one or more slots that are within the COT based on determining that the one or more slots are for S-SSBs. The sidelink message component 1135 may be configured as or otherwise support a means for transmitting, to a second UE, the sidelink message in the set of multiple slots of the COT.

In some examples, to support transmitting the signaling to provide transmissions, the transmission component 1130 may be configured as or otherwise support a means for determining that a first S-SSB is to be transmitted in a first slot of the one or more slots. In some examples, to support transmitting the signaling to provide transmissions, the transmission component 1130 may be configured as or otherwise support a means for transmitting a second S-SSB in at least one subsequent slot of the one or more slots. In some examples, the second S-SSB is a repetition of the first S-SSB.

In some examples, to support transmitting the signaling to provide transmissions, the transmission component 1130 may be configured as or otherwise support a means for transmitting, by the first UE, a padding signal in the one or more slots for S-SSBs. In some examples, the padding signal includes an S-SSB. In some examples, the COT is for a subband, and where the padding signal includes a first signal on a first set of resource blocks adjacent a first frequency edge of the subband, and a second signal on a second set of resource blocks adjacent a second frequency edge of the subband.

In some examples, to support transmitting the signaling to provide transmissions, the gap control component 1155 may be configured as or otherwise support a means for determining that a first S-SSB is to be transmitted in a slot of the one or more slots. In some examples, to support transmitting the signaling to provide transmissions, the gap control component 1155 may be configured as or otherwise support a means for transmitting a padding signal in a last one or more symbol periods of the slot of the one or more slots that are for S-SSBs.

In some examples, the padding signal includes a repetition of a PBCH signal of the first S-SSB. In some examples, the padding signal includes a CPE of a signal in a first symbol of a first slot of the set of multiple slots for transmitting the sidelink message, where the first slot is immediately subsequent to the slot of the one or more slots that are for S-SSBs.

In some examples, to support transmitting the signaling to provide transmissions, the S-SSB component 1160 may be configured as or otherwise support a means for transmitting, to a second UE, an indication for the second UE to transmit one or more S-SSBs in the one or more slots that are for S-SSBs.

In some examples, to support transmitting the signaling to provide transmissions, the S-SSB component 1160 may be configured as or otherwise support a means for transmitting, by the first UE in the one or more slots, sidelink signals in frequency resources that are multiplexed with frequency resources allocated to the S-SSBs.

In some examples, to support transmitting the signaling to provide transmissions, the S-SSB component 1160 may be configured as or otherwise support a means for transmitting, to a second UE, an indication for the second UE to transmit a repetition of one or more S-SSBs to span the one or more slots that are for S-SSBs.

In some examples, to support transmitting the signaling to provide transmissions, the gap control component 1155 may be configured as or otherwise support a means for transmitting, to the second UE, an indication for the second UE to transmit a CPE of a signal in a last symbol of a slot of the set of multiple slots that immediately precedes a first symbol of a first slot of the one or more slots, where the signal is of an S-SSB that is in a first symbol of a first slot of the one or more slots that are for S-SSBs.

In some examples, the gap control component 1155 may be configured as or otherwise support a means for transmitting, to the second UE, an indication for the second UE to rate match a PBCH signal from a first symbol of a first slot of the one or more slots to a last symbol of a slot of the set of multiple slots that immediately precedes the first symbol of the first slot.

In some examples, the gap control component 1155 may be configured as or otherwise support a means for transmitting, to the second UE, an indication of a type of the LBT procedure and an indication of a gap control procedure for an end of an S-SSB to be transmitted by the second UE.

In some examples, the transmission component 1165 may be configured as or otherwise support a means for receiving control signaling identifying an S-SSB transmission configuration, where the determining that the one or more slots are for S-SSBs is based on the received control signaling.

Additionally, or alternatively, the communications manager 1120 may support wireless communication at a second UE in accordance with examples as disclosed herein. The S-SSB slot component 1140 may be configured as or otherwise support a means for receiving control signaling identifying a set of slots for S-SSBs. The COT indication component 1145 may be configured as or otherwise support a means for receiving, from a first UE, a message indicating a COT that includes a set of multiple slots for the first UE to use to transmit a sidelink message and indicating one or more slots of the set of slots during which the second UE is to transmit one or more S-SSBs, the one or more slots being within the COT. The S-SSB transmission component 1150 may be configured as or otherwise support a means for transmitting the one or more S-SSBs during the one or more slots based on the message receiving from the first UE.

In some examples, the LBT component 1125 may be configured as or otherwise support a means for receiving, from the first UE, an indication of a type of LBT procedure associated with the COT.

In some examples, the S-SSB transmission component 1150 may be configured as or otherwise support a means for transmitting one or more repetitions of the one or more S-SSBs during the one or more slots within the COT.

In some examples, the S-SSB transmission component 1150 may be configured as or otherwise support a means for receiving an indication that the second UE is to disable transmission of one or more S-SSBs.

In some examples, the SCI component 1170 may be configured as or otherwise support a means for receiving, via COT-SI or SCI, an indication that the second UE is to transmit the one or more S-SSBs during the one or more slots within the COT. In some examples, the SCI indicates a quantity of slots of the one or more slots in which the second UE is to transmit the one or more S-SSBs.

In some examples, the gap control component 1155 may be configured as or otherwise support a means for receiving, from the first UE, an indication for the second UE to transmit a CPE of a signal in a last symbol of a slot of the set of multiple slots that immediately precedes a first symbol of a first slot of the one or more slots, where the signal is of an S-SSB that is in a first symbol of a first slot of the one or more slots that are for S-SSBs.

In some examples, the gap control component 1155 may be configured as or otherwise support a means for receiving, from the first UE, an indication for the second UE to rate match a PBCH signal from a first symbol of a first slot of the one or more slots to a last symbol of a slot of the set of multiple slots that immediately precedes the first symbol of the first slot.

In some cases, the LBT component 1125, the transmission component 1130, the sidelink message component 1135, the S-SSB slot component 1140, the COT indication component 1145, the S-SSB transmission component 1150, the gap control component 1155, the S-SSB component 1160, the transmission component 1165, and the SCI component 1170 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the LBT component 1125, the transmission component 1130, the sidelink message component 1135, the S-SSB slot component 1140, the COT indication component 1145, the S-SSB transmission component 1150, the gap control component 1155, the S-SSB component 1160, the transmission component 1165, and the SCI component 1170 discussed herein.

Figure 12:
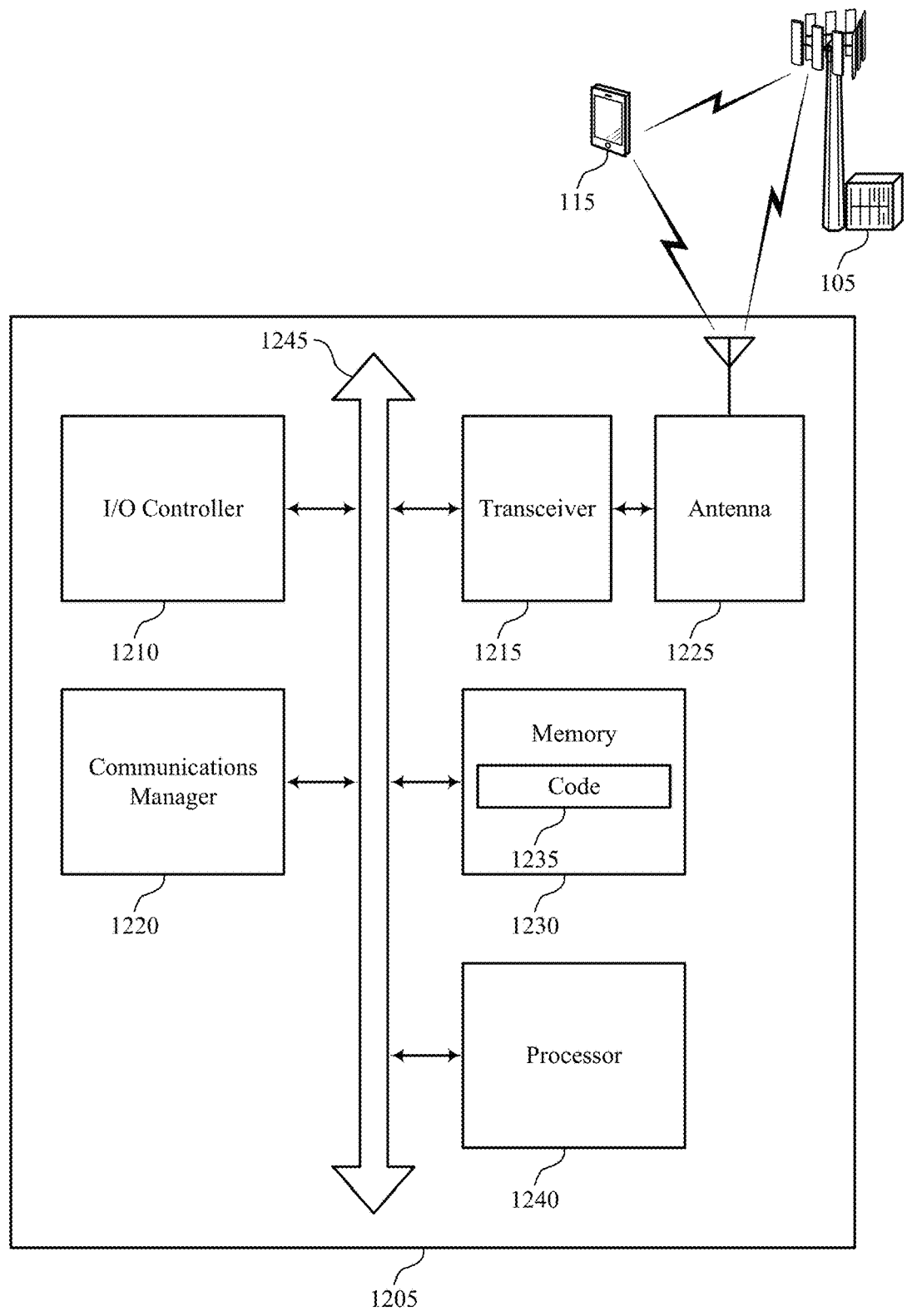
FIG. 12 shows a diagram of a system including a device that supports maintaining COT across S-SSB slots in unlicensed sidelink in accordance with one or more aspects of the present disclosure.

FIG. 12 shows a diagram of a system 1200 including a device 1205 that supports maintaining a COT across S-SSB slots in unlicensed sidelink in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting maintaining a COT across S-SSB slots in unlicensed sidelink). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communication at a first UE in accordance with examples as disclosed herein. For example, the communications manager 1220 may be configured as or otherwise support a means for performing an LBT procedure to identify a COT that includes a set of multiple slots for transmitting a sidelink message. The communications manager 1220 may be configured as or otherwise support a means for transmitting signaling to provide transmissions in one or more slots that are within the COT based on determining that the one or more slots are for S-SSBs. The communications manager 1220 may be configured as or otherwise support a means for transmitting, to a second UE, the sidelink message in the set of multiple slots of the COT.

Additionally, or alternatively, the communications manager 1220 may support wireless communication at a second UE in accordance with examples as disclosed herein. For example, the communications manager 1220 may be configured as or otherwise support a means for receiving control signaling identifying a set of slots for S-SSBs. The communications manager 1220 may be configured as or otherwise support a means for receiving, from a first UE, a message indicating a COT that includes a set of multiple slots for the first UE to use to transmit a sidelink message and indicating one or more slots of the set of slots during which the second UE is to transmit one or more S-SSBs, the one or more slots being within the COT. The communications manager 1220 may be configured as or otherwise support a means for transmitting the one or more S-SSBs during the one or more slots based on the message receiving from the first UE.

By including or configuring the communications manager 1220 in accordance with examples as described herein, the device 1205 may support techniques for maintaining a COT across S-SSB slots in unlicensed sidelink, which may increase signaling throughput and decrease power and energy consumption.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of maintaining a COT across S-SSB slots in unlicensed sidelink as described herein, or the processor 1240 and the memory 1230 may be otherwise configured to perform or support such operations.

Figure 13:
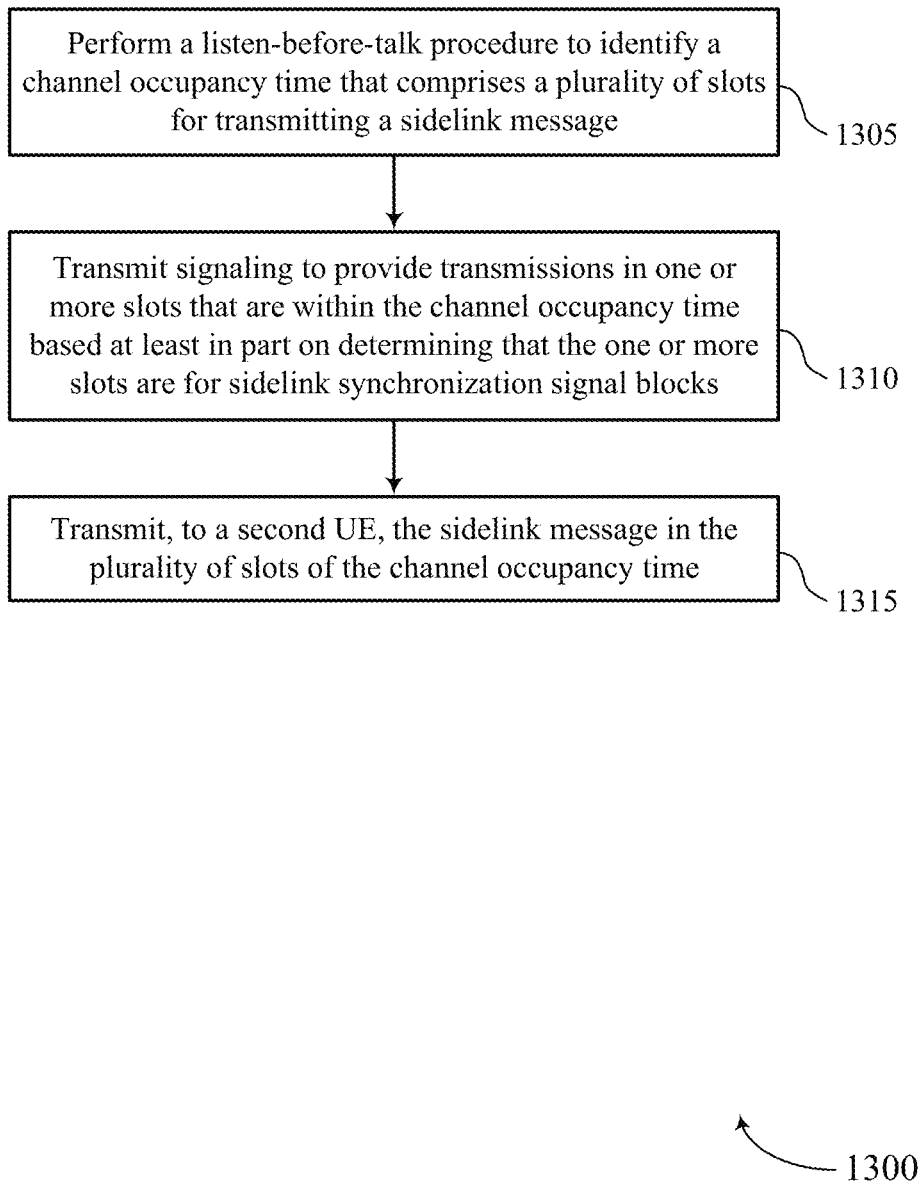
FIGS. 13 through 18 show flowcharts illustrating methods that support maintaining COT across S-SSB slots in unlicensed sidelink in accordance with one or more aspects of the present disclosure.

FIG. 13 shows a flowchart illustrating a method 1300 that supports maintaining a COT across S-SSB slots in unlicensed sidelink in accordance with one or more aspects of the present disclosure. The operations of the method 1300 may be implemented by a UE or its components as described herein. For example, the operations of the method 1300 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1305, the method may include performing an LBT procedure to identify a COT that includes a set of multiple slots for transmitting a sidelink message. The operations of 1305 may be performed in accordance with examples as disclosed herein. In some examples, aspects of the operations of 1305 may be performed by an LBT component 1125 as described with reference to FIG. 11.

At 1310, the method may include transmitting signaling to provide transmissions in one or more slots that are within the COT based on determining that the one or more slots are for S-SSBs. The operations of 1310 may be performed in accordance with examples as disclosed herein. In some examples, aspects of the operations of 1310 may be performed by a transmission component 1130 as described with reference to FIG. 11.

At 1315, the method may include transmitting, to a second UE, the sidelink message in the set of multiple slots of the COT. The operations of 1315 may be performed in accordance with examples as disclosed herein. In some examples, aspects of the operations of 1315 may be performed by a sidelink message component 1135 as described with reference to FIG. 11.

Figure 14:
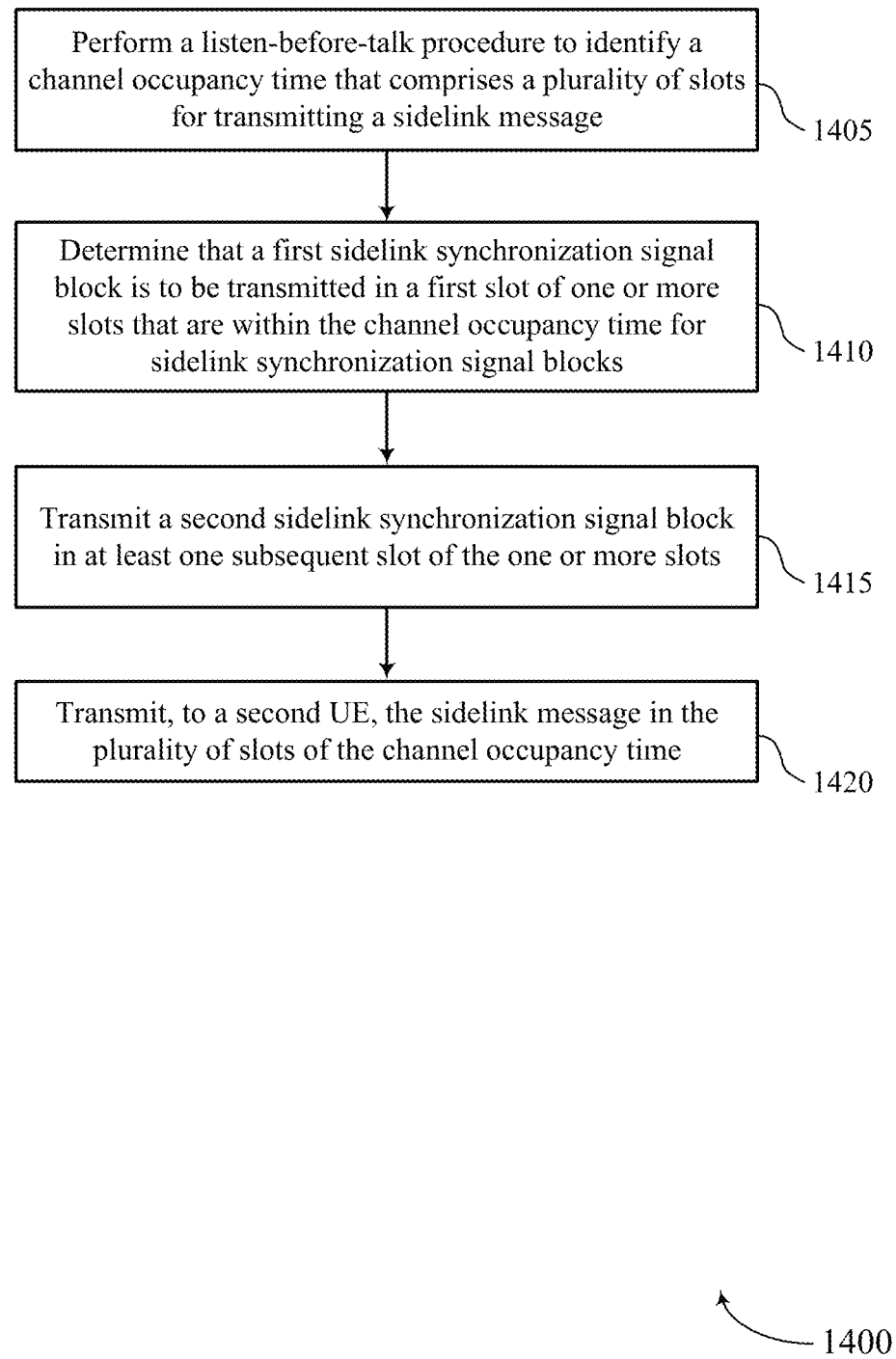

FIG. 14 shows a flowchart illustrating a method 1400 that supports maintaining a COT across S-SSB slots in unlicensed sidelink in accordance with one or more aspects of the present disclosure. The operations of the method 1400 may be implemented by a UE or its components as described herein. For example, the operations of the method 1400 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1405, the method may include performing an LBT procedure to identify a COT that includes a set of multiple slots for transmitting a sidelink message. The operations of 1405 may be performed in accordance with examples as disclosed herein. In some examples, aspects of the operations of 1405 may be performed by an LBT component 1125 as described with reference to FIG. 11.

At 1410, the method may include determining that a first S-SSB is to be transmitted in a first slot of one or more slots that are within the COT for S-SSBs. The operations of 1410 may be performed in accordance with examples as disclosed herein. In some examples, aspects of the operations of 1410 may be performed by a transmission component 1130 as described with reference to FIG. 11.

At 1415, the method may include transmitting a second S-SSB in at least one subsequent slot of the one or more slots. The operations of 1415 may be performed in accordance with examples as disclosed herein. In some examples, aspects of the operations of 1415 may be performed by a transmission component 1130 as described with reference to FIG. 11.

At 1420, the method may include transmitting, to a second UE, the sidelink message in the set of multiple slots of the COT. The operations of 1420 may be performed in accordance with examples as disclosed herein. In some examples, aspects of the operations of 1420 may be performed by a sidelink message component 1135 as described with reference to FIG. 11.

Figure 15:
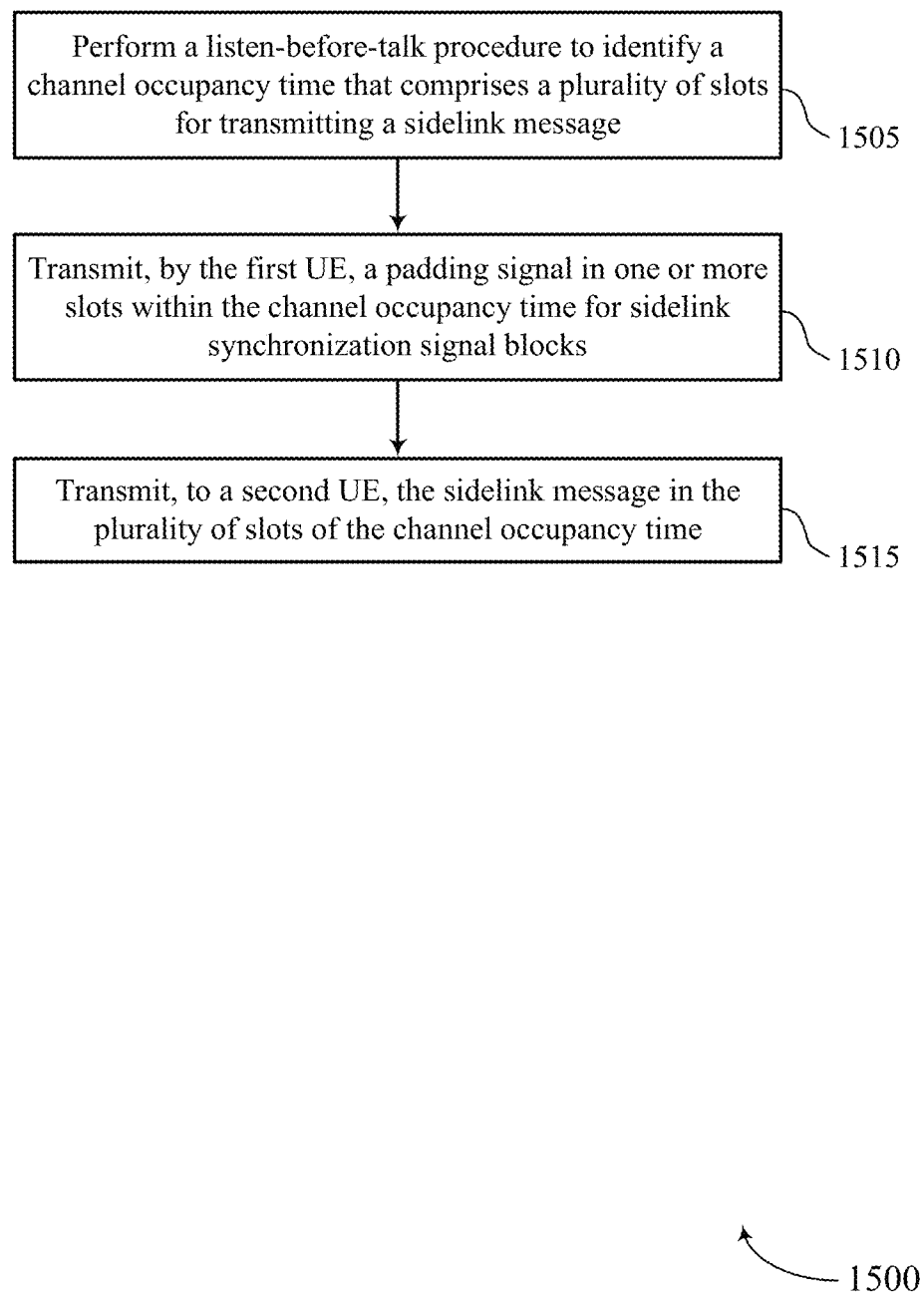

FIG. 15 shows a flowchart illustrating a method 1500 that supports maintaining a COT across S-SSB slots in unlicensed sidelink in accordance with one or more aspects of the present disclosure. The operations of the method 1500 may be implemented by a UE or its components as described herein. For example, the operations of the method 1500 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1505, the method may include performing an LBT procedure to identify a COT that includes a set of multiple slots for transmitting a sidelink message. The operations of 1505 may be performed in accordance with examples as disclosed herein. In some examples, aspects of the operations of 1505 may be performed by an LBT component 1125 as described with reference to FIG. 11.

At 1510, the method may include transmitting, by the first UE, a padding signal in one or more slots within the COT for S-SSBs. The operations of 1510 may be performed in accordance with examples as disclosed herein. In some examples, aspects of the operations of 1510 may be performed by a transmission component 1130 as described with reference to FIG. 11.

At 1515, the method may include transmitting, to a second UE, the sidelink message in the set of multiple slots of the COT. The operations of 1515 may be performed in accordance with examples as disclosed herein. In some examples, aspects of the operations of 1515 may be performed by a sidelink message component 1135 as described with reference to FIG. 11.

Figure 16:
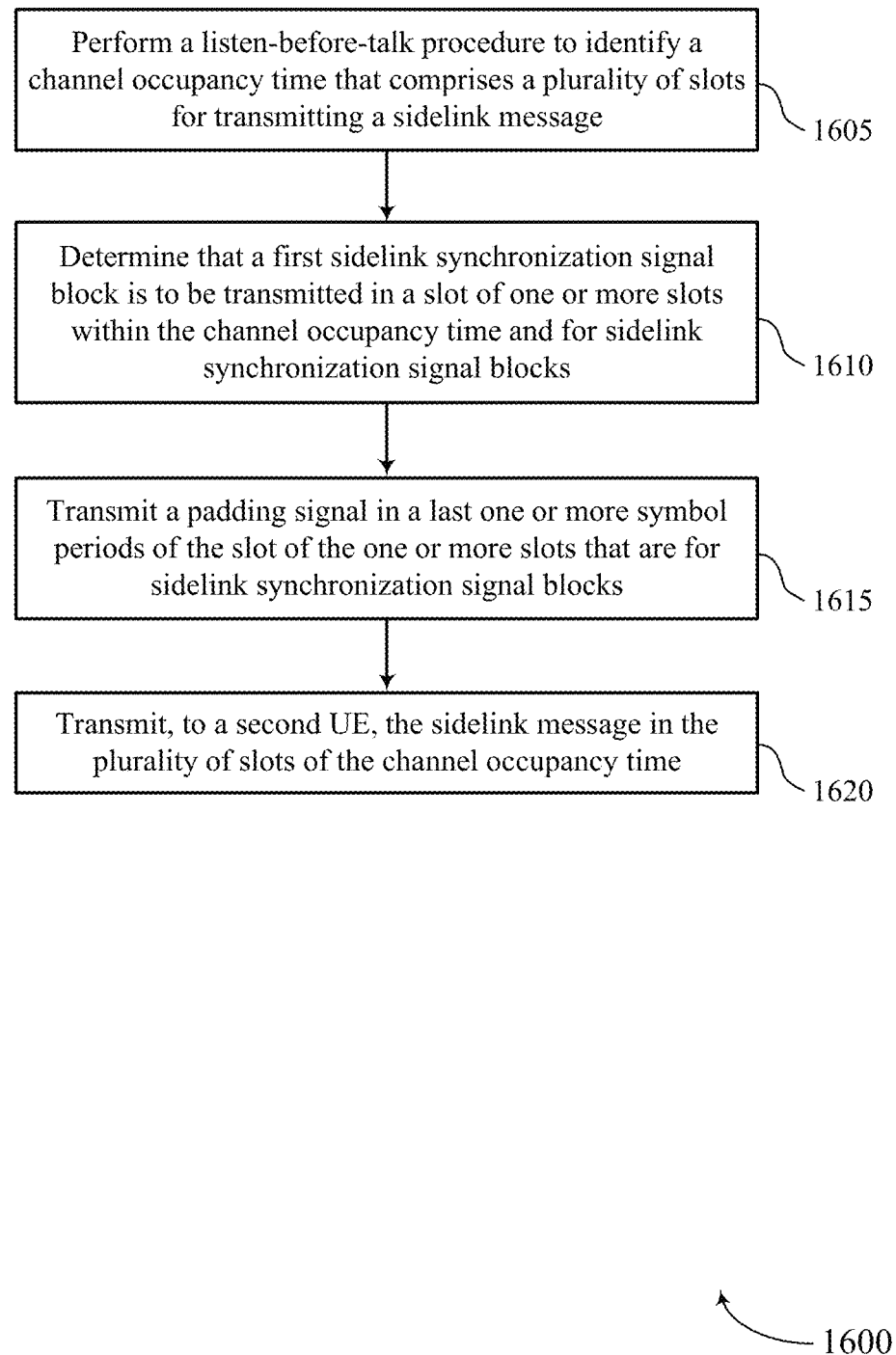

FIG. 16 shows a flowchart illustrating a method 1600 that supports maintaining a COT across S-SSB slots in unlicensed sidelink in accordance with one or more aspects of the present disclosure. The operations of the method 1600 may be implemented by a UE or its components as described herein. For example, the operations of the method 1600 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1605, the method may include performing an LBT procedure to identify a COT that includes a set of multiple slots for transmitting a sidelink message. The operations of 1605 may be performed in accordance with examples as disclosed herein. In some examples, aspects of the operations of 1605 may be performed by an LBT component 1125 as described with reference to FIG. 11.

At 1610, the method may include determining that a first S-SSB is to be transmitted in a slot of one or more slots within the COT and for S-SSBs. The operations of 1610 may be performed in accordance with examples as disclosed herein. In some examples, aspects of the operations of 1610 may be performed by a gap control component 1155 as described with reference to FIG. 11.

At 1615, the method may include transmitting a padding signal in a last one or more symbol periods of the slot of the one or more slots that are for S-SSBs. The operations of 1615 may be performed in accordance with examples as disclosed herein. In some examples, aspects of the operations of 1615 may be performed by a gap control component 1155 as described with reference to FIG. 11.

At 1620, the method may include transmitting, to a second UE, the sidelink message in the set of multiple slots of the COT. The operations of 1620 may be performed in accordance with examples as disclosed herein. In some examples, aspects of the operations of 1620 may be performed by a sidelink message component 1135 as described with reference to FIG. 11.

Figure 17:
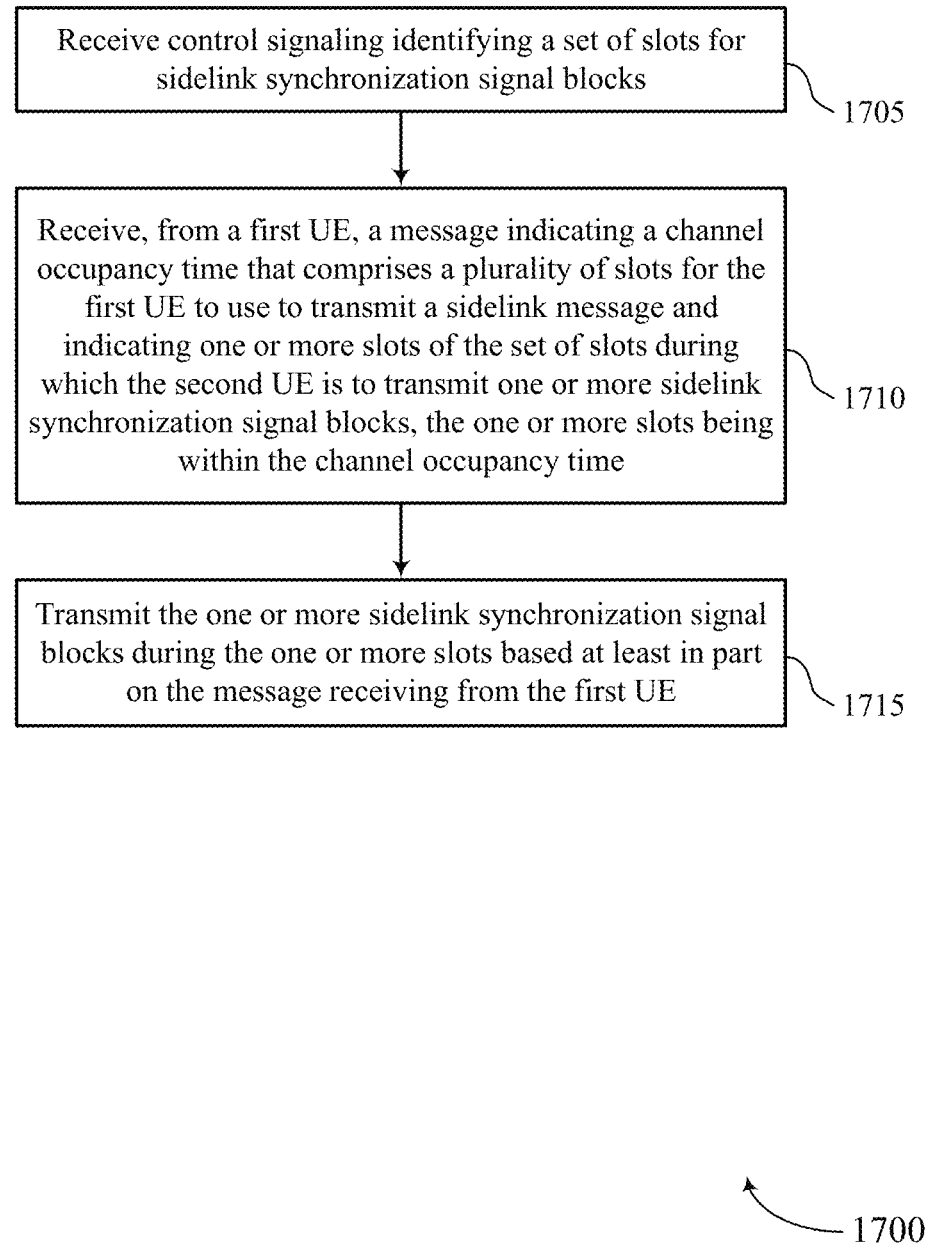

FIG. 17 shows a flowchart illustrating a method 1700 that supports maintaining a COT across S-SSB slots in unlicensed sidelink in accordance with one or more aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1705, the method may include receiving control signaling identifying a set of slots for S-SSBs. The operations of 1705 may be performed in accordance with examples as disclosed herein. In some examples, aspects of the operations of 1705 may be performed by an S-SSB slot component 1140 as described with reference to FIG. 11.

At 1710, the method may include receiving, from a first UE, a message indicating a COT that includes a set of multiple slots for the first UE to use to transmit a sidelink message and indicating one or more slots of the set of slots during which the second UE is to transmit one or more S-SSBs, the one or more slots being within the COT. The operations of 1710 may be performed in accordance with examples as disclosed herein. In some examples, aspects of the operations of 1710 may be performed by a COT indication component 1145 as described with reference to FIG. 11.

At 1715, the method may include transmitting the one or more S-SSBs during the one or more slots based on the message receiving from the first UE. The operations of 1715 may be performed in accordance with examples as disclosed herein. In some examples, aspects of the operations of 1715 may be performed by an S-SSB transmission component 1150 as described with reference to FIG. 11.

Figure 18:
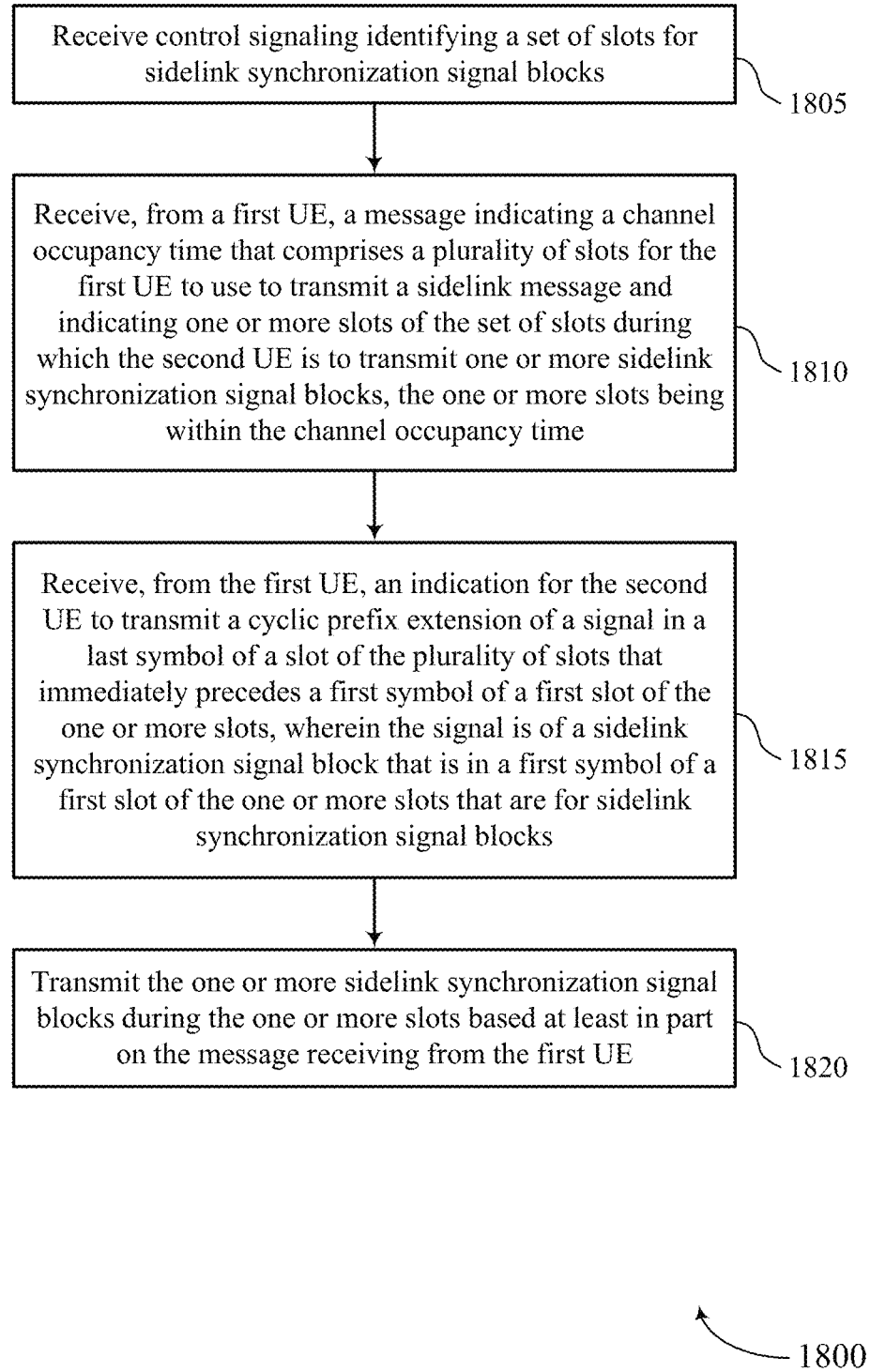

FIG. 18 shows a flowchart illustrating a method 1800 that supports maintaining a COT across S-SSB slots in unlicensed sidelink in accordance with one or more aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1805, the method may include receiving control signaling identifying a set of slots for S-SSBs. The operations of 1805 may be performed in accordance with examples as disclosed herein. In some examples, aspects of the operations of 1805 may be performed by an S-SSB slot component 1140 as described with reference to FIG. 11.

At 1810, the method may include receiving, from a first UE, a message indicating a COT that includes a set of multiple slots for the first UE to use to transmit a sidelink message and indicating one or more slots of the set of slots during which the second UE is to transmit one or more S-SSBs, the one or more slots being within the COT. The operations of 1810 may be performed in accordance with examples as disclosed herein. In some examples, aspects of the operations of 1810 may be performed by a COT indication component 1145 as described with reference to FIG. 11.

At 1815, the method may include receiving, from the first UE, an indication for the second UE to transmit a CPE of a signal in a last symbol of a slot of the set of multiple slots that immediately precedes a first symbol of a first slot of the one or more slots, where the signal is of an S-SSB that is in a first symbol of a first slot of the one or more slots that are for S-SSBs. The operations of 1815 may be performed in accordance with examples as disclosed herein. In some examples, aspects of the operations of 1815 may be performed by a gap control component 1155 as described with reference to FIG. 11.

At 1820, the method may include transmitting the one or more S-SSBs during the one or more slots based on the message receiving from the first UE. The operations of 1820 may be performed in accordance with examples as disclosed herein. In some examples, aspects of the operations of 1820 may be performed by an S-SSB transmission component 1150 as described with reference to FIG. 11.

The following provides an overview of aspects of the present disclosure:

Aspect 1: A method for wireless communication at a first UE, comprising: performing a LBT procedure to identify a COT that comprises a plurality of slots for transmitting a sidelink message; transmitting signaling to provide transmissions in one or more slots that are within the COT based at least in part on determining that the one or more slots are for S-SSBs; and transmitting, to a second UE, the sidelink message in the plurality of slots of the COT.

Aspect 2: The method of aspect 1, wherein transmitting the signaling to provide transmissions comprises: determining that a first S-SSB is to be transmitted in a first slot of the one or more slots; and transmitting a second S-SSB in at least one subsequent slot of the one or more slots.

Aspect 3: The method of aspect 2, wherein the second S-SSB is a repetition of the first S-SSB.

Aspect 4: The method of any of aspects 1 through 3, wherein transmitting the signaling to provide transmissions comprises: transmitting, by the first UE, a padding signal in the one or more slots for S-SSBs.

Aspect 5: The method of aspect 4, wherein the padding signal comprises a S-SSB.

Aspect 6: The method of any of aspects 4 through 5, wherein the COT is for a subband, and wherein the padding signal comprises a first signal on a first set of resource blocks adjacent a first frequency edge of the subband, and a second signal on a second set of resource blocks adjacent a second frequency edge of the subband.

Aspect 7: The method of any of aspects 1 through 6, wherein transmitting the signaling to provide transmissions comprises: determining that a first S-SSB is to be transmitted in a slot of the one or more slots; and transmitting a padding signal in a last one or more symbol periods of the slot of the one or more slots that are for S-SSBs.

Aspect 8: The method of aspect 7, wherein the padding signal comprises a repetition of a PBCH signal of the first S-SSB.

Aspect 9: The method of any of aspects 7 through 8, wherein the padding signal comprises a CPE of a signal in a first symbol of a first slot of the plurality of slots for transmitting the sidelink message, wherein the first slot is immediately subsequent to the slot of the one or more slots that are for S-SSBs.

Aspect 10: The method of any of aspects 1 through 9, wherein transmitting the signaling to provide transmissions comprises: transmitting, to a second UE, an indication for the second UE to transmit one or more S-SSBs in the one or more slots that are for S-SSBs.

Aspect 11: The method of any of aspects 1 through 10, wherein transmitting the signaling to provide transmissions comprises: transmitting, by the first UE in the one or more slots, sidelink signals in frequency resources that are multiplexed with frequency resources allocated to the S-SSBs.

Aspect 12: The method of any of aspects 1 through 11, wherein transmitting the signaling to provide transmissions comprises: transmitting, to a second UE, an indication for the second UE to transmit a repetition of one or more S-SSBs to span the one or more slots that are for S-SSBs.

Aspect 13: The method of any of aspects 1 through 12, wherein transmitting the signaling to provide transmissions comprises: transmitting, to the second UE, an indication for the second UE to transmit a CPE of a signal in a last symbol of a slot of the plurality of slots that immediately precedes a first symbol of a first slot of the one or more slots, wherein the signal is of a S-SSB that is in a first symbol of a first slot of the one or more slots that are for S-SSBs.

Aspect 14: The method of any of aspects 1 through 13, further comprising: transmitting, to the second UE, an indication for the second UE to rate match a PBCH signal from a first symbol of a first slot of the one or more slots to a last symbol of a slot of the plurality of slots that immediately precedes the first symbol of the first slot.

Aspect 15: The method of any of aspects 1 through 14, further comprising: transmitting, to the second UE, an indication of a type of the LBT procedure and an indication of a gap control procedure for an end of a S-SSB to be transmitted by the second UE.

Aspect 16: The method of any of aspects 1 through 15, further comprising: receiving control signaling identifying a S-SSB transmission configuration, wherein the determining that the one or more slots are for S-SSBs is based at least in part on the received control signaling.

Aspect 17: A method for wireless communication at a second UE, comprising: receiving control signaling identifying a set of slots for S-SSBs; receiving, from a first UE, a message indicating a COT that comprises a plurality of slots for the first UE to use to transmit a sidelink message and indicating one or more slots of the set of slots during which the second UE is to transmit one or more S-SSBs, the one or more slots being within the COT; and transmitting the one or more S-SSBs during the one or more slots based at least in part on the message receiving from the first UE.

Aspect 18: The method of aspect 17, further comprising: receiving, from the first UE, an indication of a type of LBT procedure associated with the COT.

Aspect 19: The method of any of aspects 17 through 18, further comprising: transmitting one or more repetitions of the one or more S-SSBs during the one or more slots within the COT.

Aspect 20: The method of any of aspects 17 through 19, further comprising: receiving an indication that the second UE is to disable transmission of one or more S-SSBs.

Aspect 21: The method of any of aspects 17 through 20, further comprising: receiving, via COT-SI or SCI, an indication that the second UE is to transmit the one or more S-SSBs during the one or more slots within the COT.

Aspect 22: The method of aspect 21, wherein the SCI indicates a quantity of slots of the one or more slots in which the second UE is to transmit the one or more S-SSBs.

Aspect 23: The method of any of aspects 17 through 22, further comprising: receiving, from the first UE, an indication for the second UE to transmit a CPE of a signal in a last symbol of a slot of the plurality of slots that immediately precedes a first symbol of a first slot of the one or more slots, wherein the signal is of a S-SSB that is in a first symbol of a first slot of the one or more slots that are for S-SSBs.

Aspect 24: The method of any of aspects 17 through 23, further comprising: receiving, from the first UE, an indication for the second UE to rate match a PBCH signal from a first symbol of a first slot of the one or more slots to a last symbol of a slot of the plurality of slots that immediately precedes the first symbol of the first slot.

Aspect 25: An apparatus for wireless communication at a first UE, comprising a processor; memory coupled with the processor; and instructions stored in the memory and executable by the processor to cause the apparatus to perform a method of any of aspects 1 through 16.

Aspect 26: An apparatus for wireless communication at a first UE, comprising at least one means for performing a method of any of aspects 1 through 16.

Aspect 27: A non-transitory computer-readable medium storing code for wireless communication at a first UE, the code comprising instructions executable by a processor to perform a method of any of aspects 1 through 16.

Aspect 28: An apparatus for wireless communication at a second UE, comprising a processor; memory coupled with the processor; and instructions stored in the memory and executable by the processor to cause the apparatus to perform a method of any of aspects 17 through 24.

Aspect 29: An apparatus for wireless communication at a second UE, comprising at least one means for performing a method of any of aspects 17 through 24.

Aspect 30: A non-transitory computer-readable medium storing code for wireless communication at a second UE, the code comprising instructions executable by a processor to perform a method of any of aspects 17 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first user equipment (UE), comprising:
    a processor;
    memory coupled with the processor; and
    instructions stored in the memory and executable by the processor to cause the apparatus to:
        perform a listen-before-talk procedure to identify a channel occupancy time that comprises a plurality of slots for transmitting a sidelink message;
        transmit signaling to provide transmissions in one or more slots that are within the channel occupancy time based at least in part on determining that the one or more slots are for sidelink synchronization signal blocks, wherein the instructions to transmit the signaling to provide transmissions are executable by the processor to cause the apparatus to transmit, by the first UE, a padding signal in the one or more slots for sidelink synchronization signal blocks, wherein the channel occupancy time is for a subband, and wherein the padding signal comprises a first signal on a first set of resource blocks adjacent a first frequency edge of the subband, and a second signal on a second set of resource blocks adjacent a second frequency edge of the subband; and
        transmit, to a second UE, the sidelink message in the plurality of slots of the channel occupancy time.

2. The apparatus of claim 1, wherein the instructions to transmit the signaling to provide transmissions are executable by the processor to cause the apparatus to:
    determine that a first sidelink synchronization signal block is to be transmitted in a first slot of the one or more slots; and
    transmit a second sidelink synchronization signal block in at least one subsequent slot of the one or more slots.

3. The apparatus of claim 2, wherein the second sidelink synchronization signal block is a repetition of the first sidelink synchronization signal block.

4. The apparatus of claim 1, wherein the padding signal comprises a sidelink synchronization signal block.

5. The apparatus of claim 1, wherein the instructions to transmit the signaling to provide transmissions are executable by the processor to cause the apparatus to:
   transmit, by the first UE in the one or more slots, sidelink signals in frequency resources that are multiplexed with frequency resources allocated to the sidelink synchronization signal blocks.

6. The apparatus of claim 1, wherein the instructions are further executable by the processor to cause the apparatus to:
   receive control signaling identifying a sidelink synchronization signal block transmission configuration, wherein the determining that the one or more slots are for sidelink synchronization signal blocks is based at least in part on the received control signaling.

7. The apparatus of claim 1, wherein the instructions to transmit the signaling are executable by the processor to cause the apparatus to transmit a message to a second UE indicating the channel occupancy time that comprises the plurality of slots for the first UE to use to transmit the sidelink message and indicating the one or more slots during which the second UE is to transmit one or more sidelink synchronization signal blocks.

8. An apparatus for wireless communication at a first user equipment (UE), comprising:
   a processor;
   memory coupled with the processor; and
   instructions stored in the memory and executable by the processor to cause the apparatus to:
      perform a listen-before-talk procedure to identify a channel occupancy time that comprises a plurality of slots for transmitting a sidelink message;
      transmit signaling to provide transmissions in one or more slots that are within the channel occupancy time based at least in part on determining that the one or more slots are for sidelink synchronization signal blocks; and
      transmit, to a second UE, the sidelink message in the plurality of slots of the channel occupancy time;
   wherein the instructions to transmit the signaling to provide transmissions are executable by the processor to cause the apparatus to:
      determine that a first sidelink synchronization signal block is to be transmitted in a slot of the one or more slots; and
      transmit a padding signal in a last one or more symbol periods of the slot of the one or more slots that are for sidelink synchronization signal blocks.

9. The apparatus of claim 8, wherein the padding signal comprises a repetition of a physical broadcast channel signal of the first sidelink synchronization signal block.

10. The apparatus of claim 8, wherein the padding signal comprises a cyclic prefix extension of a signal in a first symbol of a first slot of the plurality of slots for transmitting the sidelink message, wherein the first slot is immediately subsequent to the slot of the one or more slots that are for sidelink synchronization signal blocks.

11. The apparatus of claim 8, wherein the instructions to transmit the signaling are executable by the processor to cause the apparatus to transmit a message to a second UE indicating the channel occupancy time that comprises the plurality of slots for the first UE to use to transmit the sidelink message and indicating the one or more slots during which the second UE is to transmit one or more sidelink synchronization signal blocks.

12. An apparatus for wireless communication at a second user equipment (UE), comprising:
   a processor;
   memory coupled with the processor; and
   instructions stored in the memory and executable by the processor to cause the apparatus to:
      receive control signaling identifying a set of slots for sidelink synchronization signal blocks;
      receive, from a first UE, a message indicating a channel occupancy time that comprises a plurality of slots for the first UE to use to transmit a sidelink message and indicating one or more slots of the set of slots during which the second UE is to transmit one or more sidelink synchronization signal blocks, the one or more slots being within the channel occupancy time; and
      transmit the one or more sidelink synchronization signal blocks during the one or more slots based at least in part on the message received from the first UE;
   wherein the instructions are further executable by the processor to cause the apparatus to at least one of:
      receive, from the first UE, an indication for the second UE to transmit a cyclic prefix extension of a signal in a last symbol of a slot of the plurality of slots that immediately precedes a first symbol of a first slot of the one or more slots, wherein the signal is of a sidelink synchronization signal block that is in a first symbol of a first slot of the one or more slots that are for sidelink synchronization signal blocks;
      receive, from the first UE, an indication for the second UE to rate match a physical broadcast channel signal from a first symbol of a first slot of the one or more slots to a last symbol of a slot of the plurality of slots that immediately precedes the first symbol of the first slot; or
      receive, from the first UE, an indication of a type of the listen-before-talk procedure and an indication of a gap control procedure for an end of a sidelink synchronization signal block to be transmitted by the second UE.

13. An apparatus for wireless communication at a first user equipment (UE), comprising:
   a processor;
   memory coupled with the processor; and
   instructions stored in the memory and executable by the processor to cause the apparatus to:
      perform a listen-before-talk procedure to identify a channel occupancy time that comprises a plurality of slots for transmitting a sidelink message;
      transmit signaling to provide transmissions in one or more slots that are within the channel occupancy time based at least in part on determining that the one or more slots are for sidelink synchronization signal blocks; and
      transmit, to a second UE, the sidelink message in the plurality of slots of the channel occupancy time;
   wherein the instructions to transmit the signaling to provide transmissions are executable by the processor to cause the apparatus to:
   transmit, to the second UE, an indication for the second UE to transmit a repetition of one or more sidelink synchronization signal blocks to span the one or more slots that are for sidelink synchronization signal blocks.

14. The apparatus of claim 13, wherein the instructions to transmit the signaling are executable by the processor to cause the apparatus to transmit a message to a second UE indicating the channel occupancy time that comprises the plurality of slots for the first UE to use to transmit the sidelink message and indicating the one or more slots during which the second UE is to transmit one or more sidelink synchronization signal blocks.

15. The apparatus of claim 12, wherein the instructions are further executable by the processor to cause the apparatus to:
receive, from the first UE, the indication of the type of the listen-before-talk procedure and the indication of the gap control procedure for the end of the sidelink synchronization signal block to be transmitted by the second UE.

16. The apparatus of claim 12, wherein the instructions are further executable by the processor to cause the apparatus to:
receive, from the first UE, the indication of the type of listen-before-talk procedure associated with the channel occupancy time.

17. The apparatus of claim 12, wherein the instructions are further executable by the processor to cause the apparatus to:
transmit one or more repetitions of the one or more sidelink synchronization signal blocks during the one or more slots within the channel occupancy time.

18. The apparatus of claim 12, wherein the instructions are further executable by the processor to cause the apparatus to:
receive an indication that the second UE is to disable transmission of one or more sidelink synchronization signal blocks.

19. The apparatus of claim 12, wherein the instructions are further executable by the processor to cause the apparatus to:
receive, via channel occupancy time system information or sidelink control information, an indication that the second UE is to transmit the one or more sidelink synchronization signal blocks during the one or more slots within the channel occupancy time.

20. The apparatus of claim 19, wherein the sidelink control information indicates a quantity of slots of the one or more slots in which the second UE is to transmit the one or more sidelink synchronization signal blocks.

21. The apparatus of claim 12, wherein the instructions are further executable by the processor to cause the apparatus to:
receive, from the first UE, the indication for the second UE to transmit the cyclic prefix extension of the signal in the last symbol of the slot of the plurality of slots that immediately precedes the first symbol of the first slot of the one or more slots, wherein the signal is of the sidelink synchronization signal block that is in the first symbol of the first slot of the one or more slots that are for sidelink synchronization signal blocks.

22. The apparatus of claim 12, wherein the instructions are further executable by the processor to cause the apparatus to:
receive, from the first UE, the indication for the second UE to rate match the physical broadcast channel signal from the first symbol of the first slot of the one or more slots to the last symbol of the slot of the plurality of slots that immediately precedes the first symbol of the first slot.

23. A method for wireless communication at a first user equipment (UE), comprising:

performing a listen-before-talk procedure to identify a channel occupancy time that comprises a plurality of slots for transmitting a sidelink message;
transmitting signaling to provide transmissions in one or more slots that are within the channel occupancy time based at least in part on determining that the one or more slots are for sidelink synchronization signal blocks; and
transmitting, to a second UE, the sidelink message in the plurality of slots of the channel occupancy time;
wherein transmitting the signaling to provide transmissions comprises:
determining that a first sidelink synchronization signal block is to be transmitted in a slot of the one or more slots; and
transmitting a padding signal in a last one or more symbol periods of the slot of the one or more slots that are for sidelink synchronization signal blocks.

24. The method of claim 23, wherein the padding signal comprises a repetition of a physical broadcast channel signal of the first sidelink synchronization signal block.

25. The method of claim 23, wherein the padding signal comprises a cyclic prefix extension of a signal in a first symbol of a first slot of the plurality of slots for transmitting the sidelink message, wherein the first slot is immediately subsequent to the slot of the one or more slots that are for sidelink synchronization signal blocks.

26. An apparatus for wireless communication at a first user equipment (UE), comprising:
a processor;
memory coupled with the processor; and
instructions stored in the memory and executable by the processor to cause the apparatus to:
perform a listen-before-talk procedure to identify a channel occupancy time that comprises a plurality of slots for transmitting a sidelink message;
transmit signaling to provide transmissions in one or more slots that are within the channel occupancy time based at least in part on determining that the one or more slots are for sidelink synchronization signal blocks; and
transmit, to the second UE, the sidelink message in the plurality of slots of the channel occupancy time;
wherein the instructions are further executable by the processor to cause the apparatus to at least one of:
transmit, to the second UE, an indication for the second UE to transmit a cyclic prefix extension of a signal in a last symbol of a slot of the plurality of slots that immediately precedes a first symbol of a first slot of the one or more slots, wherein the signal is of a sidelink synchronization signal block that is in a first symbol of a first slot of the one or more slots that are for sidelink synchronization signal blocks;
transmit, to the second UE, an indication for the second UE to rate match a physical broadcast channel signal from a first symbol of a first slot of the one or more slots to a last symbol of a slot of the plurality of slots that immediately precedes the first symbol of the first slot; or
transmit, to the second UE, an indication of a type of the listen-before-talk procedure and an indication of a gap control procedure for an end of a sidelink synchronization signal block to be transmitted by the second UE.

27. The apparatus of claim 26, wherein the instructions to transmit the signaling to provide transmissions are executable by the processor to cause the apparatus to:

transmit, to the second UE, the indication for the second UE to transmit the cyclic prefix extension of the signal in the last symbol of the slot of the plurality of slots that immediately precedes the first symbol of the first slot of the one or more slots, wherein the signal is of the sidelink synchronization signal block that is in the first symbol of the first slot of the one or more slots that are for sidelink synchronization signal blocks.

28. The apparatus of claim 26, wherein the instructions are further executable by the processor to cause the apparatus to:

transmit, to the second UE, the indication for the second UE to rate match the physical broadcast channel signal from the first symbol of the first slot of the one or more slots to the last symbol of the slot of the plurality of slots that immediately precedes the first symbol of the first slot.

29. The apparatus of claim 26, wherein the instructions are further executable by the processor to cause the apparatus to:

transmit, to the second UE, the indication of the type of the listen-before-talk procedure and the indication of the gap control procedure for the end of the sidelink synchronization signal block to be transmitted by the second UE.

\* \* \* \* \*